United States Patent
Kim et al.

(10) Patent No.: US 10,681,683 B2
(45) Date of Patent: Jun. 9, 2020

(54) METHOD FOR TRANSMITTING UPLINK CONTROL INFORMATION OF TERMINAL IN WIRELESS COMMUNICATION SYSTEM AND TERMINAL USING THE METHOD

(71) Applicant: LG ELECTRONICS Inc., Seoul (KR)

(72) Inventors: Seonwook Kim, Seoul (KR); Jiwon Kang, Seoul (KR); Kijun Kim, Seoul (KR); Hanjun Park, Seoul (KR); Haewook Park, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/245,929

(22) Filed: Jan. 11, 2019

(65) Prior Publication Data
US 2019/0215823 A1 Jul. 11, 2019

Related U.S. Application Data

(63) Continuation of application No. PCT/KR2018/013991, filed on Nov. 15, 2018.
(Continued)

(51) Int. Cl.
| | |
|---|---|
| *H04W 72/04* | (2009.01) |
| *H04L 1/00* | (2006.01) |
| *H04L 1/18* | (2006.01) |
| *H04L 5/00* | (2006.01) |
| *H04W 48/08* | (2009.01) |
| *H04L 1/16* | (2006.01) |
| *H04W 24/10* | (2009.01) |

(52) U.S. Cl.
CPC ....... *H04W 72/0413* (2013.01); *H04L 1/0026* (2013.01); *H04L 1/1664* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 2011/0310986 A1* | 12/2011 | Heo | H04L 5/001 375/259 |
| 2012/0113831 A1* | 5/2012 | Pelletier | H04L 5/0053 370/252 |

(Continued)

FOREIGN PATENT DOCUMENTS

| | | |
|---|---|---|
| EP | 3096478 | 11/2016 |
| EP | 3232595 | 10/2017 |

(Continued)

OTHER PUBLICATIONS

LG Electronics, "Discussions on CSI reporting," R1-1715858, 3GPP TSG RAN WG1 Meeting NR#3, Nagoya, Japan, Sep. 18-21, 2017, 11 pages.
(Continued)

*Primary Examiner* — Awet Haile
(74) *Attorney, Agent, or Firm* — Fish & Richardson P.C.

(57) ABSTRACT

Provided are a method for transmitting uplink control information (UCI) of a terminal in a wireless communication system and the UE using the method. The method includes determining a number of coded symbols for the UCI transmission and transmitting the UCI on a physical uplink shared channel (PUSCH) based on the number of coded symbols. The number of coded symbols is determined among a first value based on a payload size of the UCI and an offset value and a second value based on a radio resource control (RRC) signal.

18 Claims, 18 Drawing Sheets

Related U.S. Application Data

(60) Provisional application No. 62/621,577, filed on Jan. 24, 2018, provisional application No. 62/621,027, filed on Jan. 23, 2018, provisional application No. 62/616,456, filed on Jan. 12, 2018, provisional application No. 62/590,624, filed on Nov. 26, 2017, provisional application No. 62/586,842, filed on Nov. 15, 2017.

(52) U.S. Cl.
CPC ............ *H04L 1/18* (2013.01); *H04L 5/0053* (2013.01); *H04L 5/0055* (2013.01); *H04W 48/08* (2013.01); *H04L 1/1671* (2013.01); *H04L 5/0048* (2013.01); *H04W 24/10* (2013.01)

(56) References Cited

U.S. PATENT DOCUMENTS

| | | |
|---|---|---|
| 2013/0077595 A1 | 3/2013 | Aiba et al. |
| 2016/0021653 A1 | 1/2016 | Papasakellariou et al. |
| 2017/0041921 A1* | 2/2017 | Oketani .................... H04L 1/00 |
| 2017/0273070 A1 | 9/2017 | Yi et al. |
| 2019/0149365 A1* | 5/2019 | Chatterjee ........... H04L 25/0226 370/329 |

FOREIGN PATENT DOCUMENTS

| | | |
|---|---|---|
| KR | 1020120125352 | 11/2012 |
| WO | WO2011/137408 | 11/2011 |
| WO | WO2015115804 | 8/2015 |

OTHER PUBLICATIONS

MediaTek Inc., "Remaining details for CSI reporting," R1-1718337, 3GPP TSG RAN WG1 Meeting 90bis, Prague, CZ, Oct. 9-13, 2017, 10 pages.

Texas Instruments, "On proposed enhancements to periodic CSI reporting," R1-113241, 3GPP TSG RA WG1 #66bis, Zhuhai, China, Oct. 10-14, 2011, 5 pages.

EP Supplementary Search Report in European Application No. EP18826477, dated Jan. 30, 2020, 8 pages.

* cited by examiner

METHOD FOR TRANSMITTING UPLINK CONTROL INFORMATION OF TERMINAL IN WIRELESS COMMUNICATION SYSTEM AND TERMINAL USING THE METHOD

CROSS-REFERENCE TO RELATED APPLICATIONS

Pursuant to 35 U.S.C. § 119(e), this application is a continuation of International Application PCT/KR2018/013991, with an international filing date of Nov. 15, 2018, which claims the benefit of U.S. Provisional Patent Applications Nos. 62/586,842, filed on Nov. 15, 2017, 62/590,624, filed on Nov. 26, 2017, 62/616,456, filed on Jan. 12, 2018, 62/621,027, filed on Jan. 23, 2018, and 62/621,577, filed on Jan. 24, 2018, the contents of which are hereby incorporated by reference herein in its entirety.

BACKGROUND OF THE INVENTION

Field of the Invention

The present invention relates to wireless communication and, more specifically, to a method for transmitting uplink control information of a terminal in a wireless communication system and a terminal using the same.

Related Art

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications.

A communication system considering services or terminals vulnerable to reliability or latency has also been discussed, and a next-generation RAT considering improved mobile broadband communication, massive MTC, ultra-reliable and low latency communication (URLLC), and the like, may also be termed a new RAT or new radio (NR).

In NR, methods of supporting orthogonal frequency division multiplexing (OFDM) that can have variable numerology according to various services are considered. In other words, OFDM (or multiple access) having independent numerology for each time and frequency resource region can be considered in NR systems.

In addition, NR systems consider flexibility as important design philosophy in order to support various services. For example, when a scheduling unit is a slot, NR systems can support a structure in which an arbitrary slot can be dynamically changed to a physical downlink shared channel (PDSCH) (i.e., a physical channel carrying downlink data) transmission slot (referred to as a DL slot hereafter) or a physical uplink shared channel (PUSCH) (i.e., a physical channel carrying uplink data) transmission slot (referred to as a UL slot hereafter). This may be represented as supporting dynamic DL/UL configurations.

Meanwhile, NR supports a technique of transmitting UCI through a physical uplink shared channel (PUSCH). The UCI may be transmitted alone or along with data. When the UCI is transmitted through a PUSCH, the number of coded symbols (more specifically, coded modulation symbols) of the UCI needs to be determined. Here, the amount of necessary resources based on a payload size of the UCI is compared with the amount of resources allocated for UCI transmission in the PUSCH and the number of coded symbols is determined based on the smaller amount of resources in a conventional technology.

However, it is not desirable to use such a conventional technology in the same manner in NR which needs to provide various services requiring various requirements.

SUMMARY OF THE INVENTION

An object of the present invention is to provide a method for transmitting uplink control information of a terminal in a wireless communication system and a terminal using the same.

In one aspect, provided is a method for transmitting uplink control information (UCI) of a terminal in a wireless communication system. The method includes determining a number of coded symbols for the UCI transmission and transmitting the UCI on a physical uplink shared channel (PUSCH) based on the number of coded symbols. The number of coded symbols is determined among a first value based on a payload size of the UCI and an offset value and a second value based on a radio resource control (RRC) signal.

The UCI may be transmitted along with data through the PUSCH.

The UCI may be ACK/NACK (acknowledgement/negative-acknowledgement).

The UCI may be channel state information (CSI).

The RRC signal may include information for limiting the number of resource elements allocated for the UCI in the PUSCH.

The number of coded symbols may be determined as a smaller value between the first value and the second value.

The offset may be a parameter regarding a code rate.

When available resource amount of the PUCCH cannot transmit the entire UCI, a part of the blocks constituting the UCI may be omitted in units of blocks according to a level related to the priority of the block.

In another aspect, provided is a user equipment (UE). The UE includes a transceiver configured to transmit and receive radio frequency (RF) signals and a processor connected to the transceiver to operate. The processor is configured to determine a number of coded symbols for the UCI transmission and transmit the UCI on a physical uplink shared channel (PUSCH) based on the number of coded symbols. The number of coded symbols is determined among a first value based on a payload size of the UCI and an offset value and a second value based on a radio resource control (RRC) signal.

In the present invention, in case of transmitting UCI through the PUSCH, in determining the number of coded symbols of the UCI, the smaller resource amount is determined by comparing resource amount based on the payload size of the UCI and offset and resource amount configured by a higher layer signal (More specifically, a resource amount adjusted by the higher layer signal for the resource amount allocated for the USI transmission in the PUSCH), and then the number of the coded modulation symbols is determined according to the smaller value. This method is suitable for a system in which scheduling flexibility is an important design philosophy such as NR because the network can more appropriately control the UCI transmission of the UE considering the characteristics of the service and the characteristics of the terminal/carrier.

DESCRIPTION OF EXEMPLARY EMBODIMENTS

Figure 1:
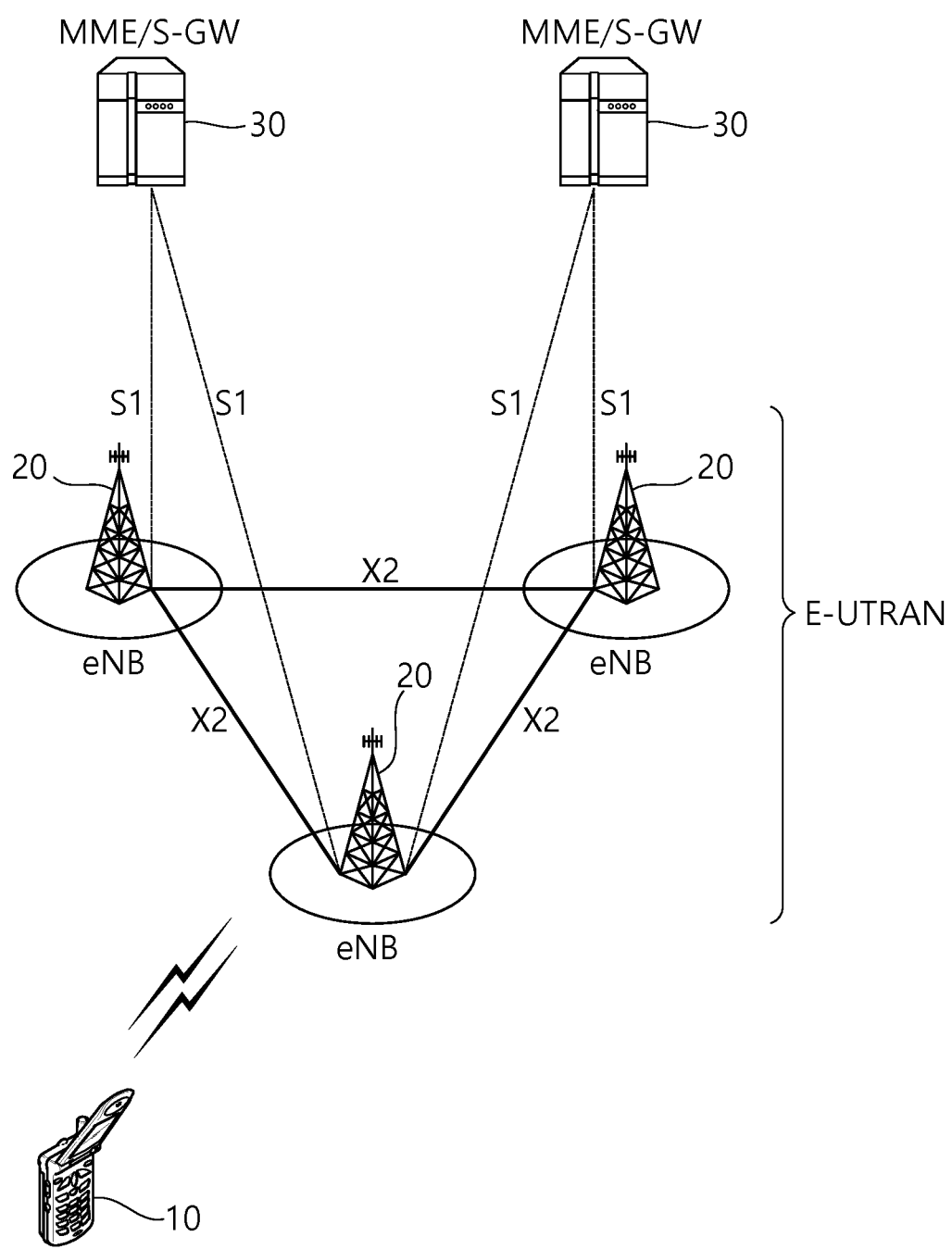
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
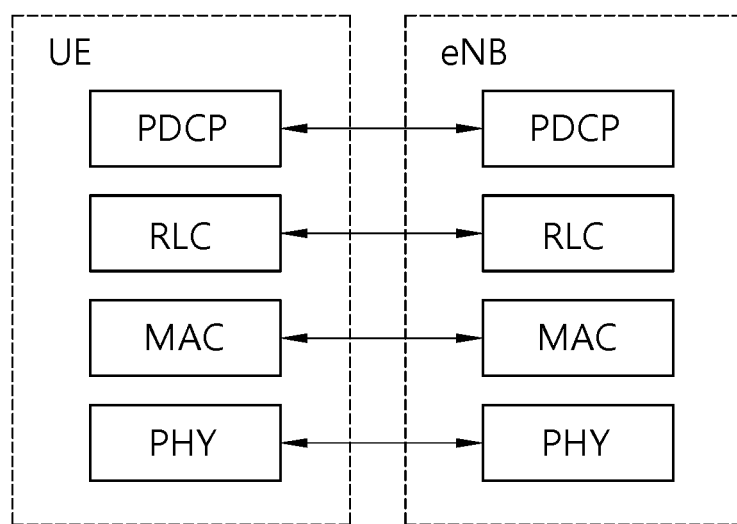
FIG. 2 is a diagram showing a radio protocol architecture for a user plane.
Figure 3:
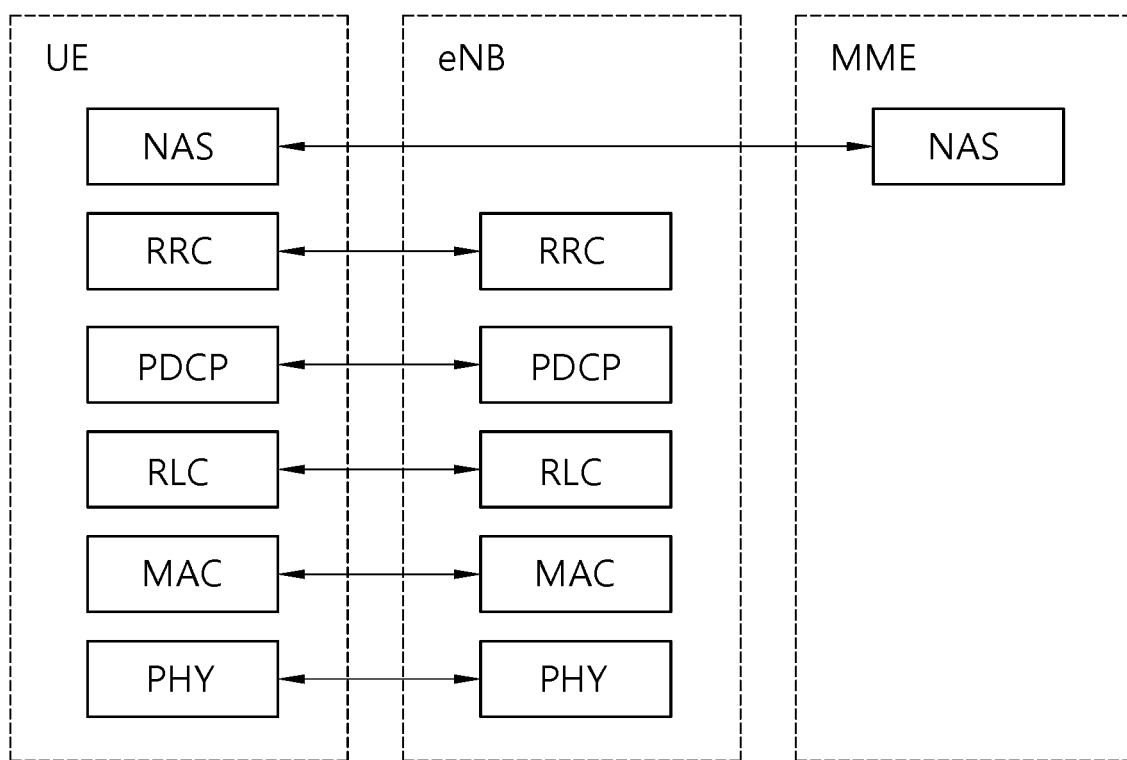
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) or new radio (NR) will be described.

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications. In addition, a communication system design considering services or terminals vulnerable to reliability or latency has also been discussed. An introduction of a next-generation RAT considering enhanced mobile broadband communication, massive MTC, ultra-reliable and low latency communication (URLLC), and the like, has been discussed, and in this disclosure, for the purposes of description, the corresponding technology will be termed new RAT or new radio (NR).

Figure 4:
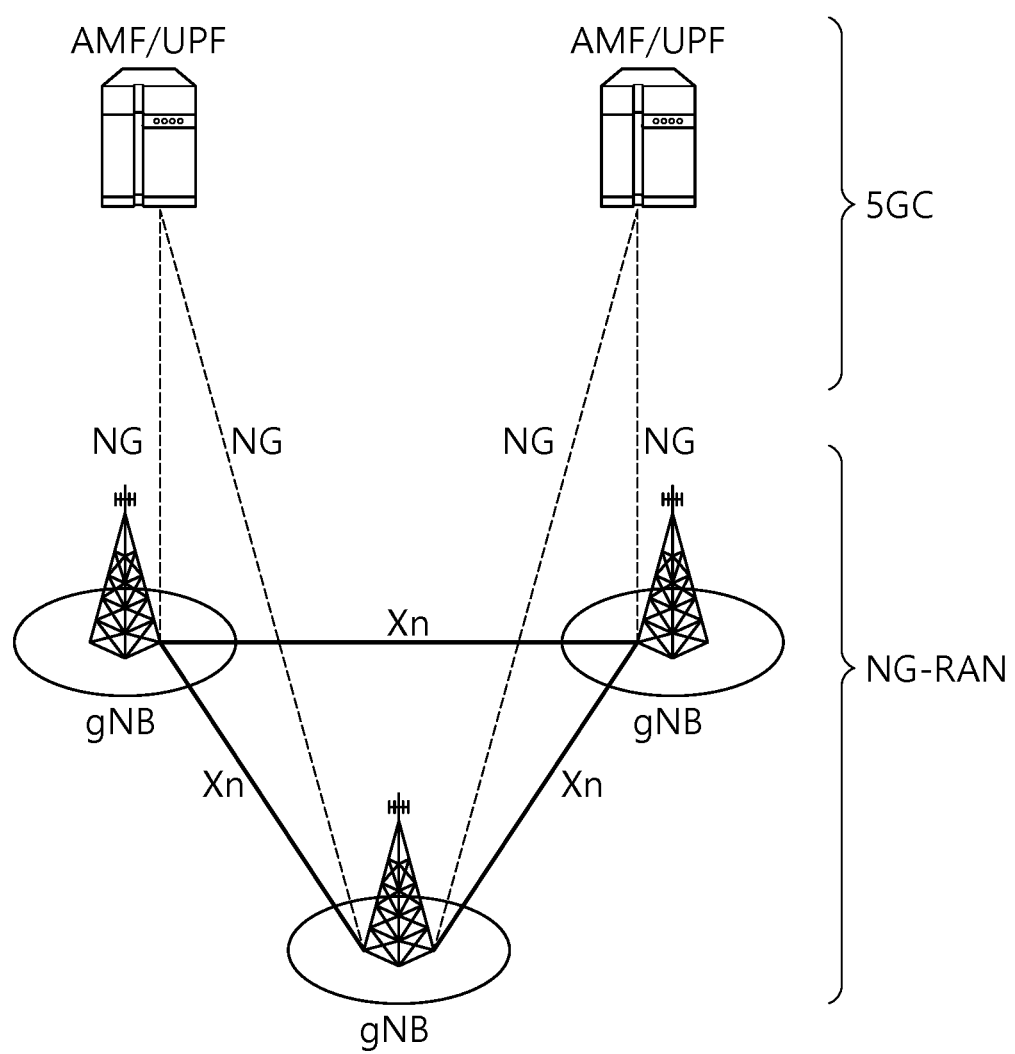
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like.

Figure 5:
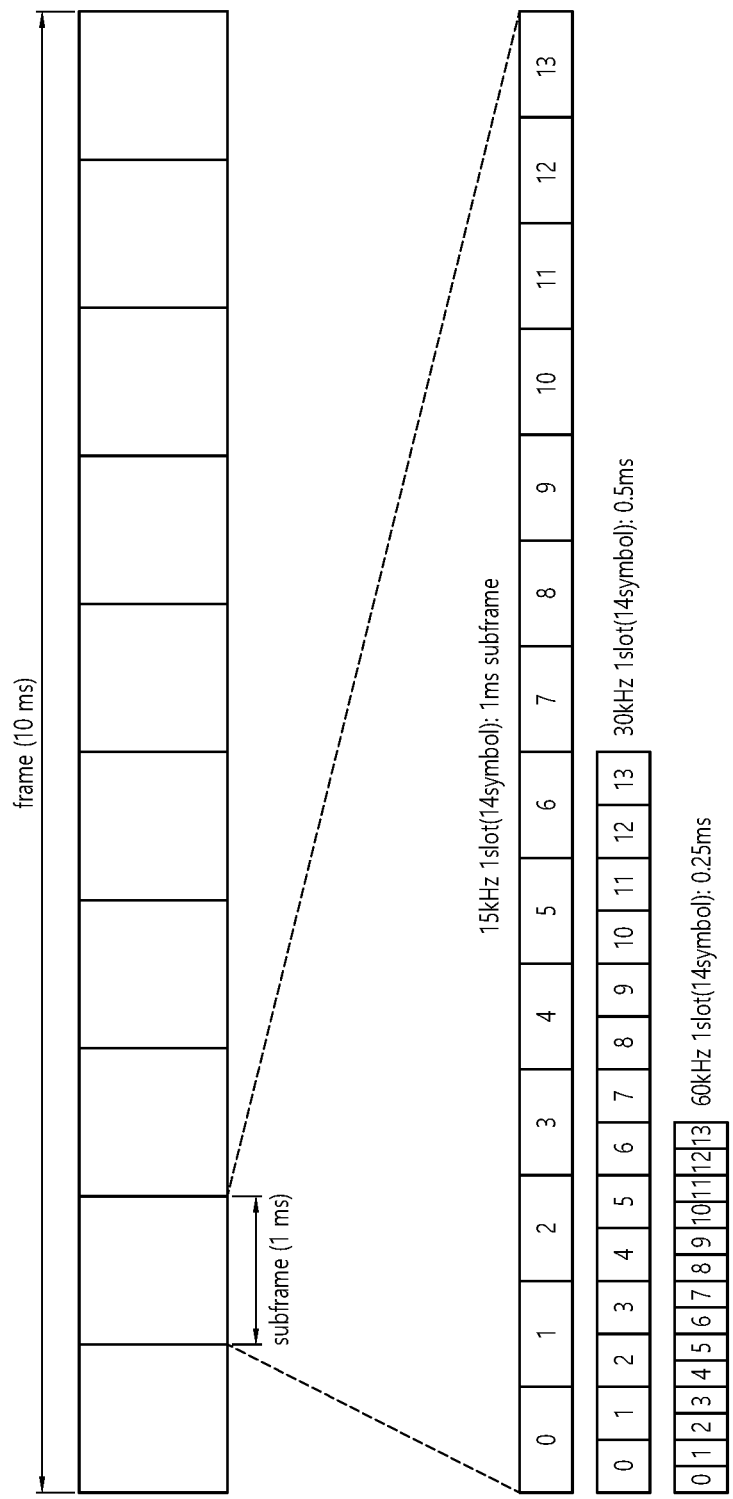
FIG. 5 illustrates a frame structure that may be applied in NR.

FIG. 5 illustrates a frame structure that may be applied in NR.

Referring to FIG. 5, a frame may be composed of 10 milliseconds (ms) and include 10 subframes each composed of 1 ms.

One or a plurality of slots may be included in a subframe according to subcarrier spacings.

The following table illustrates a subcarrier spacing configuration a.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal |
|   |    | Extended |
| 3 | 120 | Extended |
| 4 | 240 | normal |

The following table illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 5, μ=0, 1, 2 is illustrated.

A physical downlink control channel (PDCCH) may include one or more control channel elements (CCEs) as illustrated in the following table.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 6:
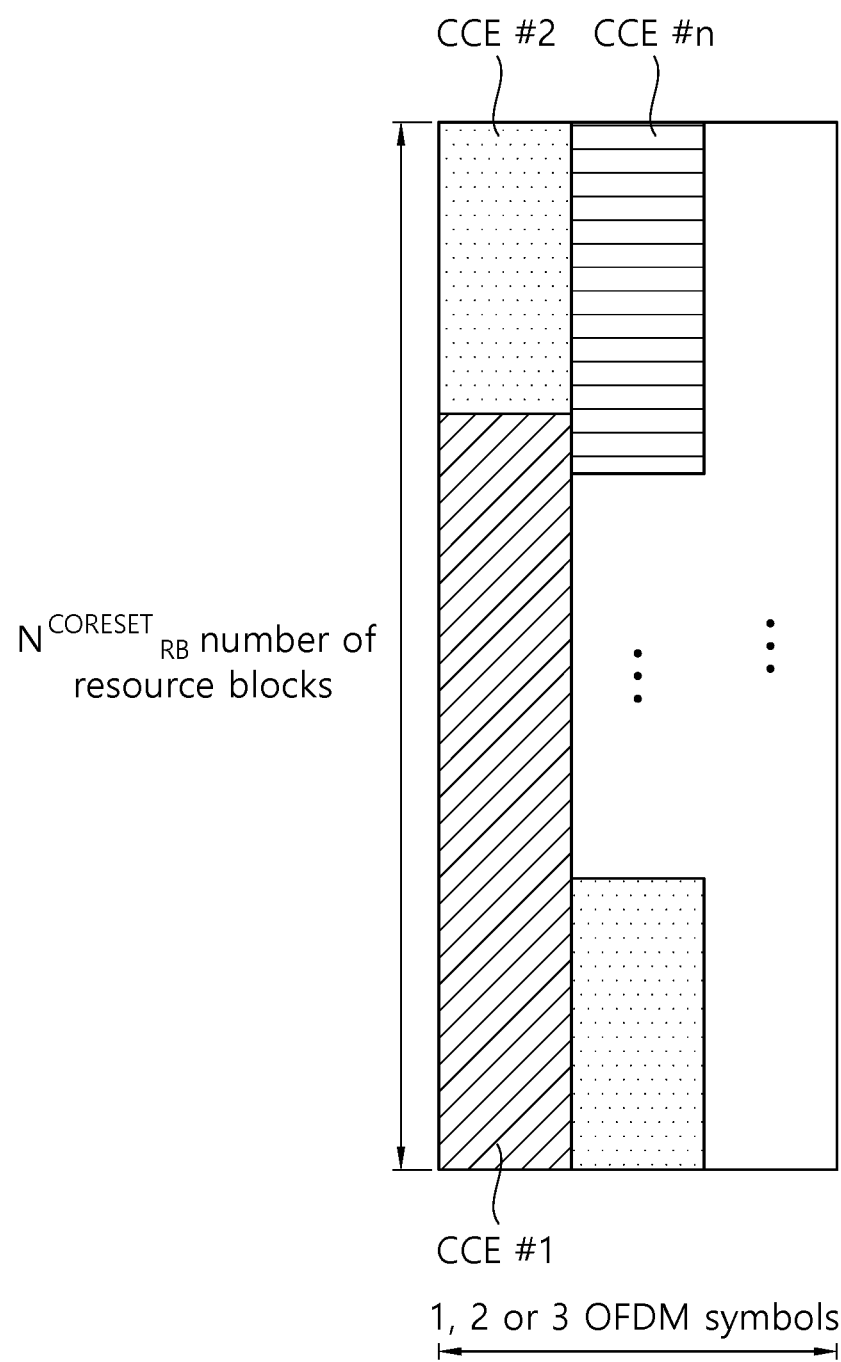
FIG. 6 illustrates CORESET.

FIG. 6 illustrates CORESET.

Referring to FIG. 6, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 6, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 7:
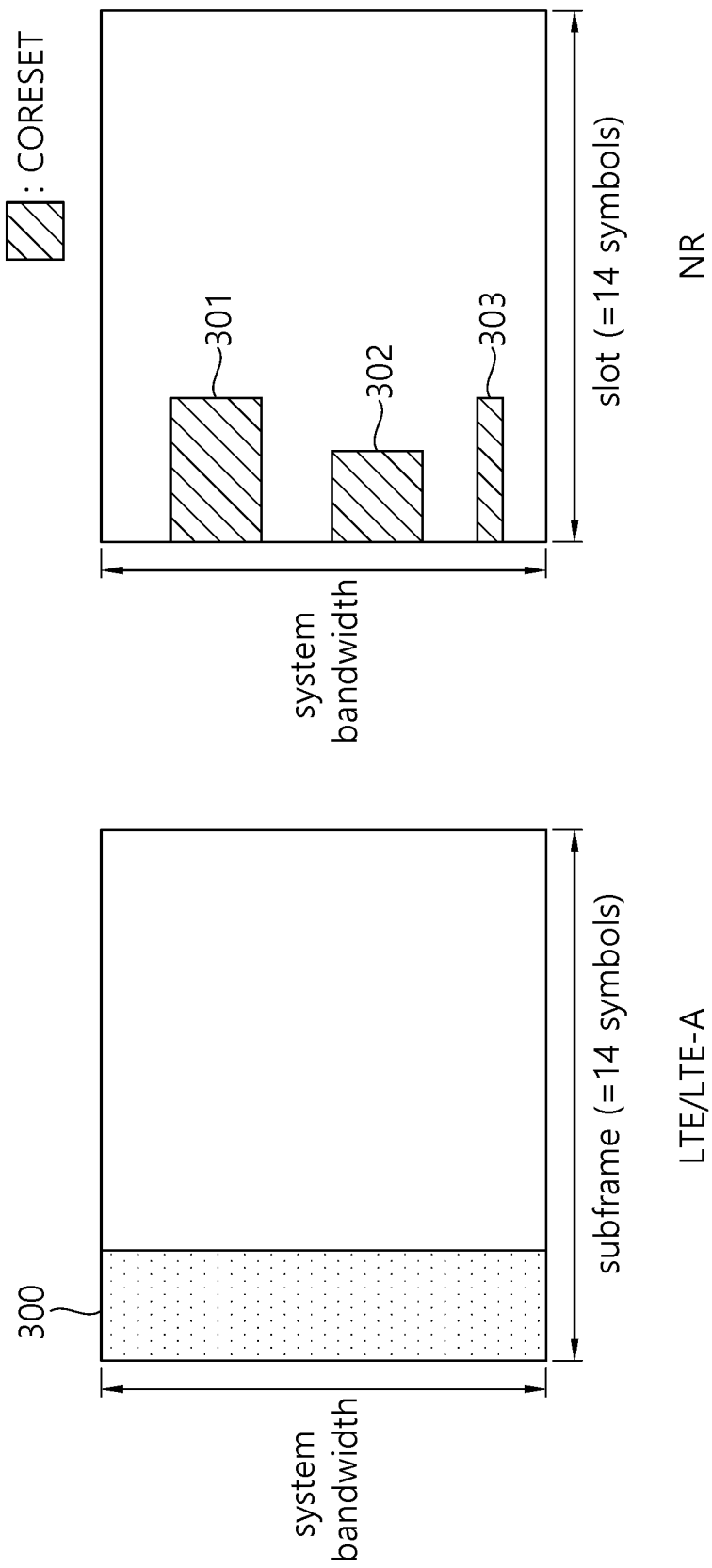
FIG. 7 is a diagram illustrating a difference between a related art control region and the CORESET in NR.

FIG. 7 is a diagram illustrating a difference between a related art control region and the CORESET in NR.

Referring to FIG. 7, a control region 300 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

In contrast, the future wireless communication system introduces the CORESET described above. CORESETs 301, 302, and 303 are radio resources for control information to be received by the terminal and may use only a portion, rather than the entirety of the system bandwidth. The BS may allocate the CORESET to each UE and may transmit control information through the allocated CORESET. For example, in FIG. 7, a first CORESET 301 may be allocated to UE 1, a second CORESET 302 may be allocated to UE 2, and a third CORESET 303 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 8:
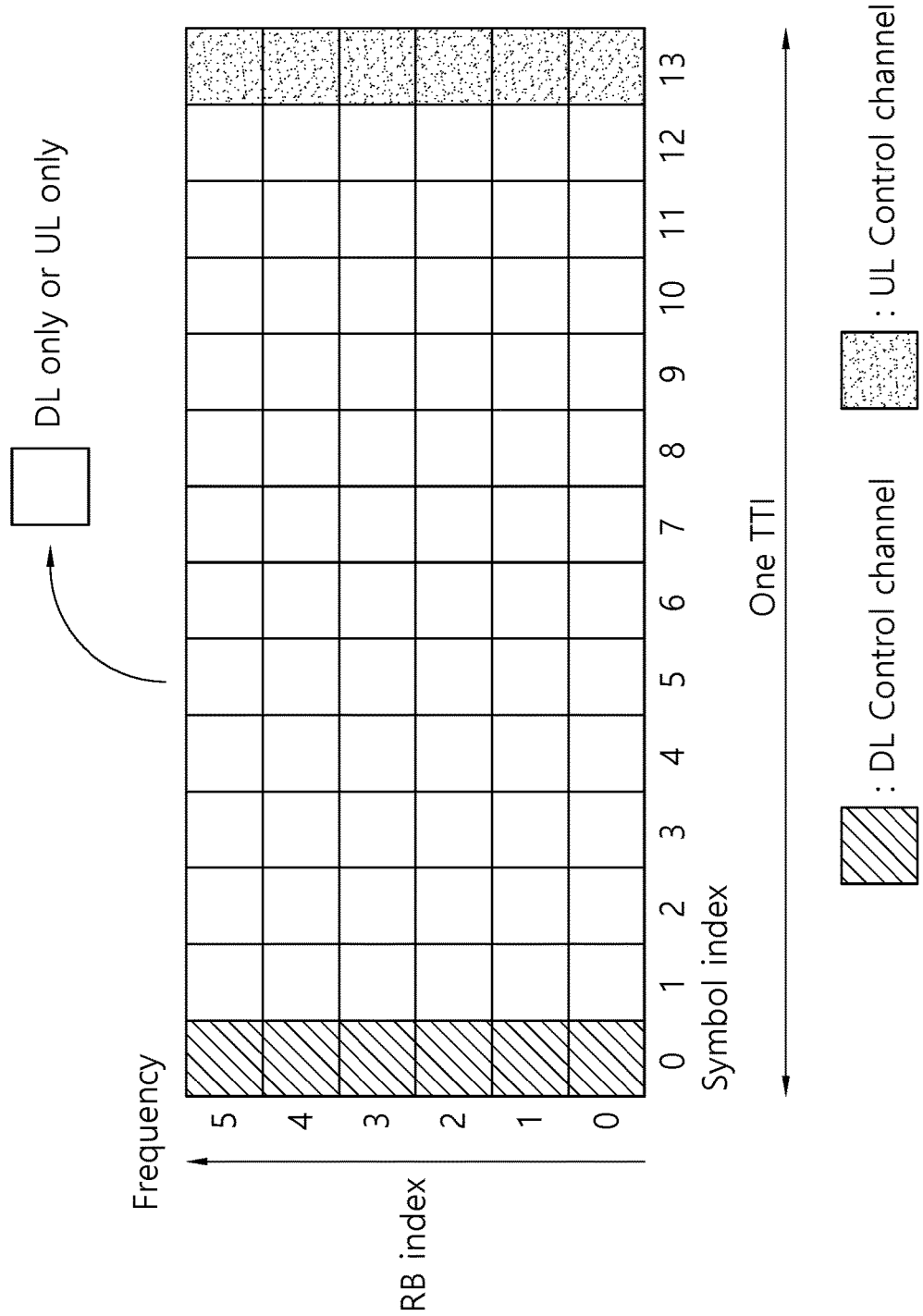
FIG. 8 illustrates an example of a frame structure that can be used in NR.

FIG. 8 illustrates an example of a frame structure that can be used in NR.

In NR, a structure in which a control channel and a data channel are time-division-multiplexed within one TTI, as shown in FIG. 8, can be considered as a frame structure in order to minimize latency.

In FIG. 8, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this self-contained subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

More specifically, a frame structure can include all of a downlink control channel, a downlink or uplink data channel and an uplink control channel within one slot unit, for example, in NR, which can be referred to as the self-contained structure. Here, the downlink control channel can carry downlink data scheduling information and uplink data scheduling information and the uplink control channel can carry ACK/NACK information, CSI information (modulation and coding scheme (MCS) information, MIMO transmission related information, etc.) and a scheduling request (SR) with respect to downlink data.

A time gap for switching from downlink to uplink (DL-to-UL) or from uplink to downlink (UL-to-DL) may be present between a control region and a data region.

In addition, a part of a downlink control channel/downlink data channel/uplink data channel/uplink control channel may not be configured within one slot. Alternatively, the order of channels constituting one slot may change (for example, channels in a slot may be configured in the order of a downlink control channel/downlink data channel/uplink control channel/uplink data channel or in the order of an uplink control channel/uplink data channel/downlink control channel/downlink data channel).

<Analog Beamforming #1>

Wavelengths are shortened in millimeter wave (mmW) and thus a large number of antenna elements can be installed in the same area. That is, the wavelength is 1 cm at 30 GHz and thus a total of 64 (8×8) antenna elements can be installed in the form of a 2-dimensional array at an interval of 0.5 lambda (wavelength) in a panel of 4×4 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming may be used.

Here, analog beamforming (or RF beamforming) refers to an operation of performing precoding (or combining) at an RF end. In hybrid beamforming, a baseband end and an RF end perform precoding (or combining) and thus it is possible to achieve the performance similar to digital beamforming while reducing the number of RF chains and the number of D/A (or A/D) converters.

Figure 9:
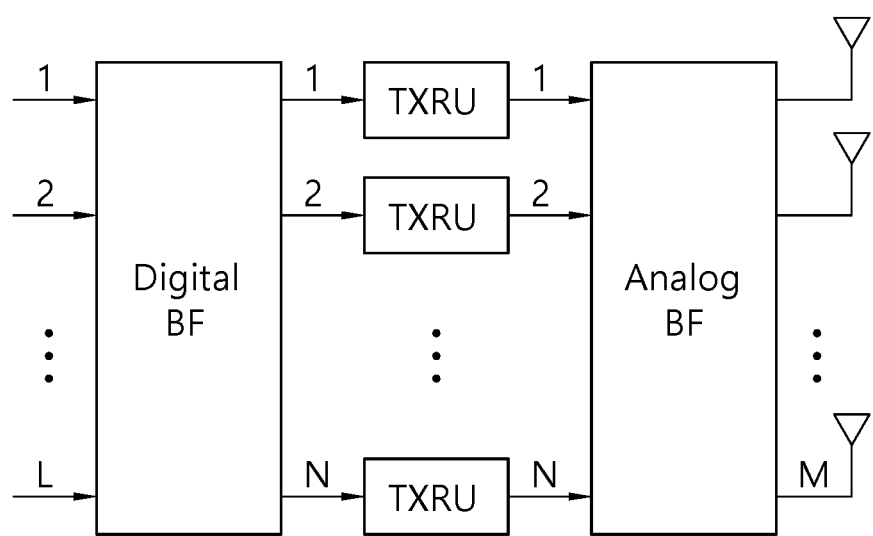
FIG. 9 is an abstract schematic diagram illustrating hybrid beamforming from the viewpoint of TXRUs and physical antennas.

FIG. 9 is an abstract schematic diagram illustrating hybrid beamforming from the viewpoint of TXRUs and physical antennas.

A hybrid beamforming structure can be represented by N transceiver units (TXRUs) and M physical antennas. Then, digital beamforming for L data layers to be transmitted by a transmission end can be represented by an N×L matrix, and N converted digital signals are converted into analog signals through the TXRUs and then analog beamforming represented by M×N matrix is applied to the analog signals.

In the NR system, base stations are designed to be able to change analog beamforming in units of symbols to support more efficient beamforming for terminals located in a specific area. Furthermore, a method of introducing a plurality of antenna panels to which independently hybrid beamforming is applicable is also considered in the NR system when N specific TXRUs and M RF antennas are defined as one antenna panel in FIG. 9.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 10:
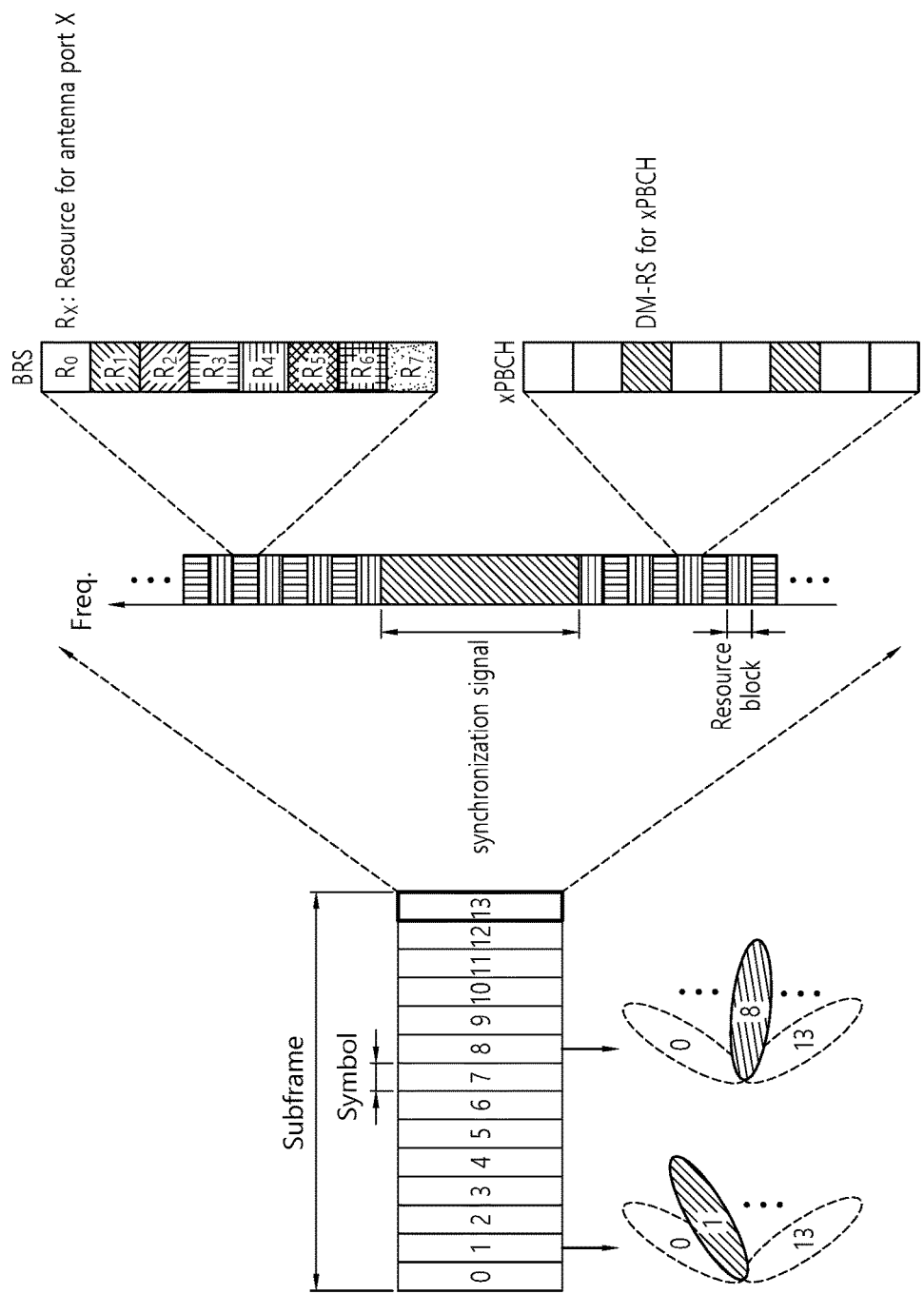
FIG. 10 illustrates the beam sweeping operation for a synchronization signal and system information in a downlink (DL) transmission procedure.

FIG. 10 illustrates the beam sweeping operation for a synchronization signal and system information in a downlink (DL) transmission procedure.

In FIG. 10, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 10, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

[RRM (Radio Resource Management) Measurement LTE]

LTE supports RRM operation including power control, scheduling, cell search, cell reselection, handover, radio link or connection monitoring, connection establishment/reestablishment, etc. Here, a serving cell can request RRM measurement information, which is a measurement value for the RRM operation, from a terminal, and a terminal can measure and report information such as cell search information, reference signal received power (RSRP) and reference signal received quality (RSRQ) with respect to each cell in LTE.

Specifically, a terminal receives 'measConfig' from a serving cell as a higher layer signal for RRM measurement in LTE. The terminal measures RSRP or RSRQ according to the information 'measConfig'. The RSRP and RSRQ are defined as follows.

The RSRP can be defined as a linear average of power contributions of resource elements which carry cell-specific reference signals within a considered measurement frequency band.

The RSRQ can be defined as N×RSRP/(E-UTRA carrier RSSI). N is the number of resource blocks in an E-UTRA carrier RSSI measurement band.

The RSSI refers to received broadband power including thermal noise and noise within a measurement band.

According to the above definition, a terminal operating in LTE can be permitted to measure RSRP in a band corresponding to one of 6, 15, 25, 50, 75 and 100 resource blocks (RBs) through an allowed measurement band transmitted in system information block type 5 (SIB5) in the case of inter-frequency measurement and through an allowed measurement band related information element (IE) transmitted in system information block type 3 (SIB3) in the case of intra-frequency measurement, or can measure RSRP in a frequency band of a DL system by default when the IE is not present.

Here, when the terminal receives an allowed measurement band, the terminal can regard the corresponding value as a maximum measurement band and freely measure an RSRP value within the corresponding value. However, when the serving cell transmits an IE defined as broadband-RSRQ and sets an allowed measurement band to 50 RB or more, the terminal needs to calculate RSRP values for all allowed measurement bands. Meanwhile, RSSI is measured in a frequency band of a receiver of the terminal according to definition of RSSI band.

The present invention relates to a method of transmitting channel state information (CSI) through an uplink channel (e.g., PUSCH or PUCCH) in the NR system.

There is demand for enhanced mobile broadband communication compared to conventional wireless access technology as an increasing number of communication devices require large communication capacity. Furthermore, massive machine type communication (MTC) which provides various services anytime anywhere by connecting a plurality of devices and things is one of important issues that need to be considered in future communication. Moreover, communication system design considering services/terminals sensitive to reliability and latency is under discussion. Introduction of future wireless access technology in consideration of the aforementioned enhanced mobile broadband communication, massive MTC, URLLC (Ultra-Reliable and Low Latency Communication) and the like is under discussion. This is referred to as new radio (NR) for convenience.

[Bandwidth Part (BWP)]

The NR system can support up to 400 MHz per component carrier (CC). If a terminal operating in such a broadband CC operates with a radio frequency (RF) unit for all CCs turned on, battery consumption of the terminal can increase.

When various usage examples (e.g., eMBB, URLLC, mMTC, etc.) operating in a single broadband CC are considered, different numerologies (e.g., subcarrier spacings) can be supported for frequency bands in the corresponding CC.

In addition, capability for a supportable maximum band may be different for terminals. In consideration of this, a base station can instruct a terminal to operate only in a part of the bandwidth of a broadband CC instead of the entire bandwidth thereof, and a part of the bandwidth may be referred to as a bandwidth part (BWP) for convenience. The BWP may be composed of consecutive resource blocks (RBs) on the frequency axis and correspond to one numerology (e.g., subcarrier spacing, CP length and slot/mini slot interval).

Meanwhile, a base station can configure multiple BWPs in a single CC configured for a terminal. For example, a BWP which occupies a relatively narrow frequency band may be configured in a PDCCH monitoring slot in which a PDCCH is monitored, and a PDSCH indicated in a PDCCH may be scheduled in a BWP which occupies a wider band than the frequency band.

Alternatively, when terminals converge on a specific BWP, some terminals may be set to another BWP for load balancing. Alternatively, a certain spectrum may be excluded from the entire bandwidth and then the remaining BWPs on both sides may be configured in the same slot in consideration of frequency domain inter-cell interference cancellation between neighbouring cells. That is, a base station can configure at least one DL/UL BWP for a terminal associated with a broadband CC and activate at least one DL/UL BWP among the configured DL/UL BWP(s) according to a MAC control element (CE) or RRC signaling at a specific time. Here, an activated DL/UL BWP is referred to as an active DL/UL BWP.

However, when a terminal is in an initial access procedure or in a situation before RRC connection, the terminal may not receive a configuration with respect to a DL/UL BWP. A DL/UL BWP assumed by the terminal in such a situation is referred to as an initial active DL/UL BWP.

Uplink control information (UCI) may be transmitted through a PUSCH as necessary.

Among UCI, CSI may be divided into part-1 CSI and part-2 CSI. The part-1 CSI may include at least one of a CSI or SSB index, a rank indicator, a layer indicator, a broadband CQI, a subband differential CQI for the first transport block, an indicator of the number of non-zero wideband amplitude coefficients for a specific layer, RSRP, and differential. The part-2 CSI may include at least one of a broadband CQI for the second transport block, PMI related information, a subband differential CQI for the second transport block, and PMI subband related information.

Now, the present invention will be described.

In the NR system, a physical uplink control channel (PUCCH) through which uplink control information (UCI) including at least one of HARQ-ACK, channel state information (CSI), a scheduling request (SR) and beam related information can be defined.

The PUCCH may include a PUCCH having a short length (hereinafter, referred to as an sPUCCH or a short PUCCH for convenience) and a relatively long PUCCH (hereinafter, referred to as a long PUCCH). The sPUCCH may be a relatively short PUCCH transmitted through one or two symbols in a slot composed of 14 symbols. The long PUCCH may be a relatively long PUCCH transmitted through four or more symbols in the slot.

In addition, UCI may be transmitted through a physical uplink shared channel (PUSCH) carrying UL data. In this case, UCI may be transmitted along with data or only UCI may be transmitted without data. When UCI is transmitted along with data through a PUSCH carrying data, this may be represented as UCI piggybacking on the PUSCH.

In the NR system, CSI may be classified into two types. These two types will be referred to as type-1 CSI and type-2 CSI.

Both the type-1 CSI and the type-2 CSI can be fed back through a CSI reporting method based on codebook. For example, the type-1 CSI may be fed back using a precoding matrix indicator (PMI) feedback method having normal spatial resolution and may require a relatively small payload size. The type-2 CSI may be fed back using a feedback method having higher spatial resolution and may require a relatively large payload size.

Each type of CSI may have three reporting methods of wideband (WB)>partial band (PB>subband (SB) according to the size of a bandwidth in which measurement is performed. The PB or the WB may refer to an active BWP. The WB may represent a bandwidth wider than the PB and the SB may represent a bandwidth narrower than the PB.

Each type of CIS may be composed of two parts: part-1 CSI which can carry rank information, for example, and has a payload size that is not variable; and part-2 CSI which includes wideband CSI, subband CSI of even-numbered subbands and subband CSI of odd-numbered subbands and may have a variable payload size according to information of the part-1 CSI (e.g., a rank value).

Furthermore, periodic/semi-persistent/aperiodic CSI reporting methods may be present according to CSI reporting periodicity.

Particularly, UCI having a large payload size, such as part-2 CSI, may be transmitted with some information omitted according to the sizes of resource regions of a PUCCH and/or a PUSCH which will be transmitted. For example, there are various types of part-2 CSI, such as wideband CSI, subband CSI of even-numbered subbands and subband CSI of odd-numbered subbands, which can be generated according to CSI report numbers/indexes. Here, the part-2 CSI may be divided according to priority levels which may be referred to as priority reporting levels for part-2 CSI.

Figure 11:
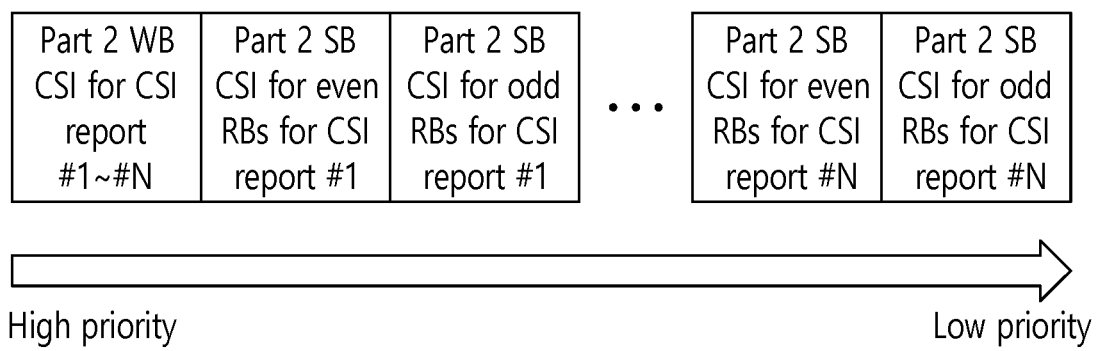
FIG. 11 illustrates an example of priority levels according to CSI types.

FIG. 11 illustrates an example of priority levels according to CSI types.

Referring to FIG. 11, when the number of CSI types to be reported in one slot is N (N may be associated with a CSI process index and a CC index, for example), priority levels for all part-2 CSI may be determined according to whether CSI is WB CSI or SB CSI, and when all CSI cannot be transmitted, blocks may be sequentially omitted from a block having a lower priority level.

In addition, when UCI piggybacking on a PUSCH is transmitted in the NR system, an offset value (hereinafter, referred to as beta_offset) may be set for each UCI type and a payload size of the corresponding UCI. The aforementioned configuration may be a semi-persistent configuration according to an RRC signal and/or a dynamic configuration according to a UL grant.

The aforementioned offset value may be a parameter for coding rate adjustment for UCI piggyback. Specifically, the offset value can be individually set (e.g., $\beta^{HARQ-ACK}_{offset}/\beta^{CSI-part1}_{offset}/\beta^{CSI-part2}_{offset}$) according to HARQ-ACK/part-1 CSI/part-2 CSI, and in the case of HARQ-ACK, a separate offset value may be set according to payload sizes, such as less than 3 bits/3 bits or more and 11 bits or less/more than 11 bits.

Furthermore, separate offset values may be set according to payload sizes, such as less than 11 bits/more than 11 bits, with respect to the part-1 CSI and the part-2 CSI.

The following Equation is an example of a Equation representing the number Q' of coded symbols carrying specific UCI (e.g., HARQ-ACK, CSI or the like) (more specifically, the number of coded modulation symbols).

$$Q' = \min\left(\left\lceil \frac{O \cdot M_{sc}^{PUSCH} \cdot N_{symb}^{PUSCH} \cdot \beta_{offset}^{PUSCH}}{\sum_{r=0}^{C-1} K_r} \right\rceil, 4 \cdot M_{sc}^{PUSCH\text{-}current}\right)$$ [Equation 1]

In the equation, min (A,B) represents a smaller one between A and B. O represents a payload size of corresponding UCI, $M^{PUSCH}_{sc}$ denotes the size of a resource region on the frequency axis (the number of subcarriers) allocated to a PUSCH, $N^{PUSCH}_{symb}$ denotes the size of a resource region on the time axis (the number of symbols) allocated to the PUSCH, and $K_r$ represents the size (number) of information bits of a code block r.

According to the aforementioned Equation, the corresponding UCI can be transmitted only within a maximum of 4 symbols in the allocated PUSCH region, and a larger number of coded symbols can be transmitted (i.e., a coding rate can decrease) for the corresponding UCI as the offset value ($\beta^{PUSCH}_{offset}$:beta_offset) increases.

The present invention proposes a method of separately encoding CSI and other UCI (e.g., ACK/NACK) and then mapping the CIS and UCI when the CSI and UCI are loaded on a PUCCH and/or a PUSCH in the NR system. In addition, in the case of UCI having a considerably large payload size, such as part-2 CSI, all information is not loaded thereon according to the sizes of resource regions of a PUCCH and/or a PUSCH which will be transmitted and thus the UCI may be transmitted with some information omitted. In this case, the present invention also proposes a method of determining information to be omitted and a method of omitting the information.

<UCI Piggybacking on PUSCH Carrying Data>

In the NR system, CSI transmitted through a PUSCH, for example, part-1 CSI and part-2 CSI, can be separately encoded. When UCI piggybacks on a PUSCH including data, some of part-2 CSI can be omitted. For example, when the UCI is piggybacked on the PUSCH, the (all) part-1 CSI may be transmitted and some (or all) of the part-2 CSI transmission may be omitted. That is, when the UCI is piggybacked on the PUSCH, it may mean that the processing method of part-1 CSI and the processing method of part-2 CSI may be different or independent.

[Method 1-a]

A maximum number of PUSCH data symbols (or a maximum number of resource elements (REs) or a maximum number of coded (modulation) symbols) through which part-2 CSI can be transmitted can be limited. With respect to the number Q of coded (modulation) symbols necessary to transmit all part-2 CSI, which is calculated on the basis of the aforementioned offset beta_offset and the payload size of part-2 CSI (to be transmitted), if it is impossible to transmit Q coded symbols through the limited number of PUSCH data symbols (or the maximum number of REs or the maximum number of coded symbols), only part-2 CSI blocks with high priority levels which can be transmitted through the PUSCH data symbols may be transmitted.

On the other hand, if it is possible to transmit the Q coded symbols necessary to transmit all part-2 CSI through the limited number of PUSCH data symbols (or the maximum number of REs or the maximum number of coded symbols), all part-2 CSI can be transmitted through the number of coded symbols calculated on the basis of the offset beta_offset.

CSI which can be included in the part-2 CSI and priority of the CSI may be as shown in the following table.

TABLE 4

Priority 0: part-2 wideband CSI for $N_{Rep}$ in CSI reports 1
Priority 1: part-2 subband CSI of even-numbered subbands with respect to CSI reports 1
Priority 2: part-2 subband CSI of odd-numbered subbands with respect to CSI reports 1
Priority 3: part-2 subband CSI of even-numbered subbands with respect to CSI reports 2
Priority 4: part-2 subband CSI of odd-numbered subbands with respect to CSI reports 2
.
.
.
Priority $2N_{Rep} - 1$: part-2 subband CSI of even-numbered subbands with respect to CSI reports $N_{Rep}$
Priority $2N_{Rep}$: part-2 subband CSI of odd-numbered subbands with respect to CSI reports $N_{Rep}$ In Table 4, $N_{Rep}$ represents the number of CSI reports in one slot. Priority 0 is highest and priority $2N_{Rep}$ is lowest. CSI having the same priority may be represented as CSI having the same level. A CSI report number may correspond to associated ReportConfigID order. When part-2 CSI having a specific priority is omitted, a terminal can omit all information having the specific priority.

Figure 12:
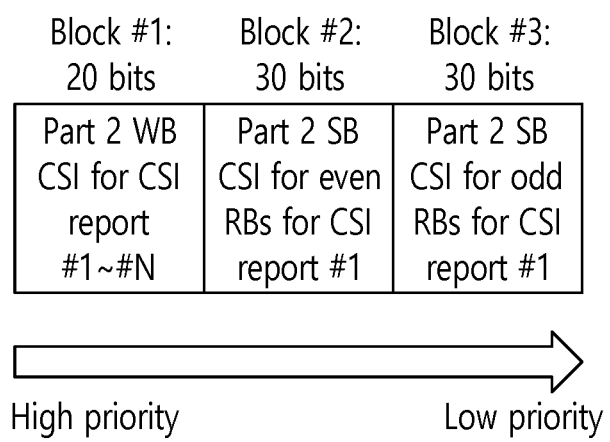
FIG. 12 illustrates part-2 CSI.

FIG. 12 illustrates part-2 CSI.

Referring to FIG. 12, part-2 CSI may be composed of blocks #1, #2 and #3, block #1 may be 20 bits, block #2 may be 30 bits and block #3 may be 30 bits. Block #1 may include wideband CSI, the block #2 may include subband CSI of even-numbered resources and block #3 may include subband CSI of odd-numbered resources.

In this case, when a maximum number of PUSCH data symbols through which the part-2 CSI can be transmitted is limited to 3 (i.e., 3 OFDM symbols in the time domain) and the PUSCH is scheduled over 10 resource blocks, for example, a maximum number of coded symbols (or resource elements) for the part-2 CSI may be 360 (=3*10*12). If the number Q of coded symbols necessary to transmit all part-2 CSI, which is calculated on the basis of the offset beta_offset and the payload size of part-2 CSI to be transmitted (80 bits in the example of FIG. 12), is larger than the maximum number of coded symbols, some of blocks #1, #2 and #3 need to be omitted. That is, when all part-2 CSI cannot be transmitted through the PUSCH, part-2 CSI with low priority can be omitted according to priority. Here, only some bits of the corresponding part-2 CSI are not omitted and the corresponding part-2 CSI can be omitted according to priority in units of levels.

Here, it is assumed that the number of coded symbols necessary to transmit block #1+block #2+block #3 is 400 and the number of coded symbols necessary to transmit block #1 and block #2 is 250. In this case, in order to transmit as many blocks of blocks #1, #2 and #3 as possible while limiting the number of necessary coded block to less than 360, block #3 can be omitted (i.e., the entire block #3 instead of some of block #3 can be omitted) and only block #1+block #2 can be transmitted. Here, block #1+block #2 may be transmitted using 250 coded symbols calculated on the basis of the offset beta_offset or rate-matched to 360 coded symbols and then transmitted.

Alternatively, a maximum number of PUSCH data symbols (or a maximum number of REs or a maximum number of coded symbols) through which part-2 CSI can be transmitted is limited. When there are K bits of a maximum payload size calculated on the basis of the offset beta_offset and the limited number of PUSCH data symbols (or the maximum number of REs or the maximum number of coded symbols), if the payload size of all part-2 CSI to be transmitted is greater than K, only a maximum number of part-2 CSI blocks (with high priority) can be transmitted such that the part-2 CSI has a largest payload size small than K bits. On the other hand, if the payload size of all part-2 CSI to be transmitted is less than K, all part-2 CSI can be transmitted through the number of coded symbols calculated on the basis of the offset beta_offset.

That is, when the maximum number of PUSCH data symbols through which the part-2 CSI can be transmitted is limited to 3 in the time domain and the PUSCH is scheduled over 10 resource blocks in the example of FIG. 12, the maximum payload size, K bits, calculated on the offset beta_offset and the limited number of PUSCH data symbols (or the number of available REs (i.e., 360)) may be 72 bits. Since 72 bits is smaller than 80 bits which is the payload size of all part-2 CSI, omission needs to be performed from a block with low priority among part-2 CSI blocks. Here, in order to transmit as many blocks having high priority while having a payload size less than 72 bits as possible, block #3 can be omitted and only block #1+block #2 can be transmitted. Here, block #1+block #2 may be transmitted using 250 coded symbols calculated by the offset beta_offset or rate-matched to 360 coded symbols and then transmitted.

[Method 1-b]

A (maximum) part-2 CSI payload size can be directly indicated using a UL grant. A maximum payload size of part-2 CSI may be determined according to rank information included in part-1 CSI. For example, when the maximum payload size of the part-2 CSI is S1 when the rank value is 1 and S2 when the rank value is 2 (it is assumed that S2>S1), it is possible to indicate whether the maximum payload size is limited to S1 or S2 using the UL grant.

If the maximum payload size is indicated as S1 but part-1 CSI is configured using information when the rank value is 2, the payload size of the part-2 CSI can be set to S1 or as many high-priority blocks having a payload size less than S1 as possible can be transmitted and transmission of the remaining low-priority blocks can be omitted. For example, when S1 is 60 bits, block #3 can be omitted and only block #1+block #2 can be transmitted in the example of FIG. 12.

Here, when the (maximum) part-2 CSI payload size is directly indicated using a UL grant, the indicated information can correspond to a specific state of the offset beta_offset for part-2 CSI which is dynamically indicated. For example, when the offset value beta_offset for the part-2 CSI is equal to or less than (or greater than) a set threshold, the UL grant can indicate that the maximum payload size of the part-2 CSI is limited to S1.

[Method 1-c]

The payload size of part-2 CSI which will piggyback can be determined within a range which does not exceed a maximum coding rate R1 of UL-SCH (data). Here, the value R1 may be a predetermined value (e.g., 0.75). Alternatively, the value R1 may be set according to RRC signalling or MAC CE or indicated on a UL grant.

For example, when HARQ-ACK, part-1 CSI and part-2 CSI are mapped to PUSCH REs calculated on the basis of the offset beta_offset and each payload size and then UL-SCH (data) is mapped to the remaining PUSCH REs, if the coding rate of the UL-SCH exceeds R1, some part-2 CSI need to be omitted. As a result, only a maximum number of high-priority blocks which does not exceed R1 can be transmitted.

For example, if the coding rate of the UL-SCH is 0.77 when the UL-SCH is transmitted through PUSCH REs which are left after all of block #1+block #2+block #3 are transmitted and the coding rate of the UL-SCH is 0.73 when the UL-SCH is transmitted through PUSCH REs which are left after only block #1+block #2 are transmitted in the example of FIG. 12, it is possible to omit block #3 and transmit only block #1+block #2.

Alternatively, when the maximum coding rate of the UL-SCH exceeds R1, it is possible to set the payload size of the part-2 CSI to S1 or to transmit as many high-priority blocks having a payload size less than S1 as possible and omit the remaining low-priority blocks, as in the above-described [Method 1-b].

The value R1 proposed in [Method 1-c] may be a PUSCH target coding rate. Specifically, the value R1 proposed in [Method 1-c] may be a target code rate corresponding to an MCS index indicated by a UL grant as shown in the following table.

TABLE 5

| MCS index $I_{MCS}$ | Modulation Order $Q_m$ | Target code Rate × 1024 R | Spectral Efficiency |
|---|---|---|---|
| 0 | 1 | 240 | 0.2344 |
| 1 | 1 | 314 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |
| 29 | 2 | reserved | |
| 30 | 4 | reserved | |
| 31 | 6 | reserved | |

In the above-described proposed method [Method 1-c], the same rule can be applied to HARQ-ACK and/or part-2 CSI as well as part-2 CSI in "determination of the payload size of part-2 CSI which will piggyback within a range which does not exceed the maximum coding rate R1 of the UL-SCH". For example, it is assumed that the number of REs (equivalently, the number of modulation symbols) through which HARQ-ACK will be transmitted is $Q'_{ACK}$, the number of REs (equivalently, the number of modulation symbols) through which part-1 CSI will be transmitted is $Q'_{CSI-part1}$ and the number of REs (equivalently, the number of modulation symbols) through which part-2 CSI will be transmitted is $Q'_{CSI-part2}$. In this case, $Q'_{ACK}$, $Q'_{CSI-part1}$ and $Q'_{CSI-part2}$ can be determined such that the number of REs for transmission of a minimum amount of TBs, which satisfies a (target) coding rate indicated through DCI, or the number of REs for transmission of a minimum amount of TBs, which satisfies a predetermined/preset specific (e.g., maximum) coding rate, can be secured.

For example, $Q'_{ACK}$, $Q'_{CSI\text{-}part1}$ and $Q'_{CSI\text{-}part2}$ may be determined by the following Equations 3, 4 and 5.

$$Q'_{ACK} = \min\left\{\left\lceil\frac{(O_{ACK}+L)\cdot M_{sc}^{PUSCH}\cdot N_{symb}^{PUSCH}\cdot \beta_{offset}^{PUSCH}}{\sum_{r=0}^{C_{UL\text{-}SCH}-1} K_r}\right\rceil,\right.$$

$$\left.\sum_{l=0}^{N_{symb,all}^{PUSCH}-1} M_{sc}^{\Phi^{UCI}}(l) - \frac{\sum_{r=0}^{C_{UL\text{-}SCH}-1} K_r}{R1}\right\}$$

[Equation 3]

$$Q'_{CSI,1} = \min\left\{\left\lceil\frac{(O_{CSI,1}+L)\cdot M_{sc}^{PUSCH}\cdot N_{symb}^{PUSCH}\cdot \beta_{offset}^{PUSCH}}{\sum_{r=0}^{C_{UL\text{-}SCH}-1} K_r}\right\rceil,\right.$$

$$\left.\left(\left(\sum_{l=0}^{N_{symb,all}^{PUSCH}-1} M_{sc}^{\Phi^{UCI}}(l)\right) - Q'_{ACK} - \frac{\sum_{r=0}^{C_{UL\text{-}SCH}-1} K_r}{R1}\right)\right\}$$

[Equation 4]

$$Q'_{CSI,2} = \min\left\{\left\lceil\frac{(O_{CSI,2}+L)\cdot M_{sc}^{PUSCH}\cdot N_{symb}^{PUSCH}\cdot \beta_{offset}^{PUSCH}}{\sum_{r=0}^{C_{UL\text{-}SCH}-1} K_r}\right\rceil,\right.$$

$$\left(\sum_{l=0}^{N_{symb,all}^{PUSCH}-1} M_{sc}^{\Phi^{UCI}}(l)\right) -$$

$$\left.Q'_{ACK} - Q'_{CSI,1} - \frac{\sum_{r=0}^{C_{UL\text{-}SCH}-1} K_r}{R1}\right\}$$

[Equation 5]

In Equations (3) and (4), HAR-ACK or part-2 CSI may be rate-matched to REs determined by min{A,B} and then transmitted.

In the above Equations, $O_{ACK}$ represents the number of HARQ-ACK bits, $O_{CSI,1}$ represents the number of part-1 CSI (which may be referred to as CSI part 1) bits, $O_{CSI,2}$ represents the number of part-2 CSI (which may be referred to as CSI part 2) bits, L denotes the number of CRC bits, $M^{PUSCH}_{sc}$ denotes a scheduled band for PUSCH transmission, $N^{PUSCH}_{symb}$ denotes the number of OFDM symbols for PUSCH transmission (except OFDM symbols used for a DMRS), $\beta^{PUSCH}_{offset}$ is $\beta^{HARQ\text{-}ACK}_{offset}$, $C_{UL\text{-}SCH}$ denotes the number of code blocks for a UL-SCH for PUSCH transmission, $K_r$ represents the size of an r-th code block for the UL-SCH for PUSCH transmission, $M^{\Phi^{UCI}}_{sc}(l)$ represents the number of elements in a set $\phi^{UCI}$, and $\phi^{UCI}_l$ is a set of resource elements available for UCI transmission in OFDM symbol l. The value R1 may be a PUSCH target coding rate.

For example, in the case of Equation (3), $$A = \left\lceil\frac{(O_{ACK}+L)\cdot M_{sc}^{PUSCH}\cdot N_{symb}^{PUSCH}\cdot \beta_{offset}^{PUSCH}}{\sum_{r=0}^{C_{UL\text{-}SCH}-1} K_r}\right\rceil$$

and $$B = \sum_{l=0}^{N_{symb,all}^{PUSCH}-1} M_{sc}^{\Phi^{UCI}}(l) - \frac{\sum_{r=0}^{C_{UL\text{-}SCH}-1} K_r}{R1}. \text{ If } A > B, \text{ HARQ-}$$

ACK or part-1 CSI is rate-matched to REs corresponding to B (REs corresponding to A if A<B) without omission of the HARQ-ACK payload or part-1 CSI payload and then transmitted.

In Equation (5), if A>B, some low-priority blocks of part-2 CSI can be omitted until A>B changes to A<B. In Equation (5), the term $$\frac{\sum_{r=0}^{C_{UL\text{-}SCH}-1} K_r}{R1}$$

may be included or may not be included. Here, the value R1 may be a PUSCH target coding rate (i.e., target coding rate corresponding to an MCS index value indicated on a UL grant). In the case of a specific MCS index (e.g., $I_{MCS}=28$, 29, 30 or 31) as in the example of Table 5, a target coding rate corresponding thereto may not be present. In this case, the value R1 may be preset to a target coding rate for the corresponding $I_{MCS}$ (for example, preset to a maximum or minimum target coding rate corresponding a modulation order corresponding thereto) or may be set to a target coding rate corresponding to an MCS index indicated by an initially transmitted UL grant of an associated HARQ process index (or most recent UL grant having a target coding rate corresponding to an indicated MCS index) if the corresponding MCS index can be indicated during PUSCH retransmission.

In the Equations 3, 4 and 5, $$A = \left\lceil\frac{(O_{ACK}+L)\cdot M_{sc}^{PUSCH}\cdot N_{symb}^{PUSCH}\cdot \beta_{offset}^{PUSCH}}{\sum_{r=0}^{C_{UL\text{-}SCH}-1} K_r}\right\rceil$$

and $$B = \sum_{l=0}^{N_{symb,all}^{PUSCH}-1} M_{sc}^{\Phi^{UCI}}(l) - \frac{\sum_{r=0}^{C_{UL\text{-}SCH}-1} K_r}{R1}$$

in min{A,B} according to PUSCH scheduling, and B=<X (e.g., X=0). In this case, R1 may be set to R1=infinity or R1=predetermined value (e.g., 948/1024), or a terminal can recognize that only UCI has been scheduled to be transmitted through a PUSCH without a UL-SCH (data).

Figure 13:
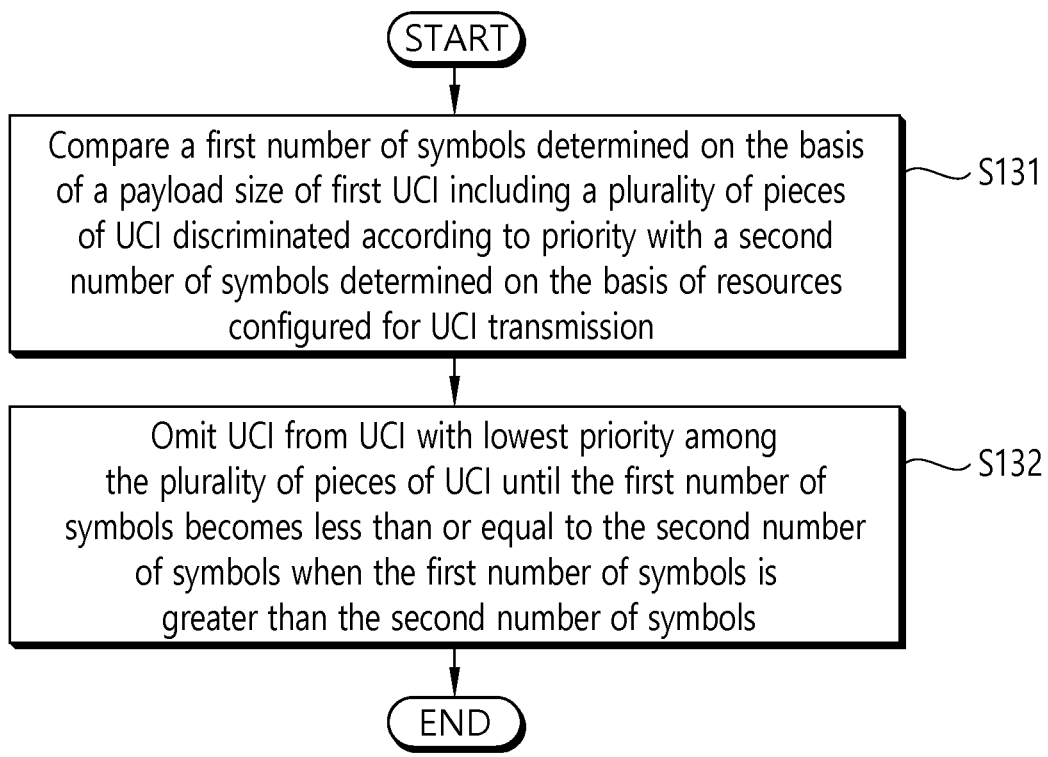
FIG. 13 illustrates a CSI transmission method according to an embodiment of the present invention.

FIG. 13 illustrates a CSI transmission method according to an embodiment of the present invention.

Referring to FIG. 13, a first number of symbols determined on the basis of a payload size of first UCI including a plurality of pieces of UCI discriminated according to priority is compared with a second number of symbols determined on the basis of resources configured for UCI transmission (S131). In the above-described example, A may correspond to the first number of symbols and B may correspond to the second number of symbols.

A terminal omits UCI from UCI having lowest priority among the plurality of pieces of UCI until the first number of symbols becomes equal to or less than the second number of symbols when the first number of symbols is greater than the second number of symbols (S132). This has been described above with reference to FIG. 12 and Equations 3 to 4 using various examples. The UCI may be part-2 UCI. When UCI is omitted from UCI having lowest priority among the plurality of pieces of UCI, omission can be performed in units of levels. Refer to Table 4 for levels according to priority. Here, the level may mean the above-described block (unit). That is, when there are a plurality of blocks (units) constituting the UCI, each block (unit) may have its own level. In this case, when all of the plurality of blocks (units) cannot be transmitted to the available resource, transmission of the lowest priority block (unit) is omitted based on the level. That is, it is omitted not the transmission of a certain (some) block (unit) but the transmission of the whole block (unit). Although it may not be the optimal method in terms of transmission resource utilization, it has the advantage of lowering the complexity.

The terminal may omit UCI from UCI having lowest priority among the plurality of pieces of UCI and then transmit the remaining UCI through a PUSCH.

The aforementioned Equations 3, 4 and 5 may be replaced by the following Equations 3-1, 4-1 and 5-1. Here, $Q_m$ refers to a modulation order indicated on a UL grant (or applied to the PUSCH).

$$Q'_{ACK} = \min\left\{\left\lceil \frac{(O_{ACK}+L) \cdot M_{sc}^{PUSCH} \cdot N_{symb}^{PUSCH} \cdot \beta_{offset}^{PUSCH}}{\sum_{r=0}^{C_{UL-SCH}-1} K_r} \right\rceil, \sum_{l=0}^{N_{symb,all}^{PUSCH}-1} M_{sc}^{\Phi UCI}(l) - \left\lceil \frac{\sum_{r=0}^{C_{UL-SCH}-1} K_r}{R1 \times Q_m} \right\rceil \right\}$$ [Equation 3-1]

$$Q'_{CSI,1} = \min\left\{\left\lceil \frac{(O_{CSI,1}+L) \cdot M_{sc}^{PUSCH} \cdot N_{symb}^{PUSCH} \cdot \beta_{offset}^{PUSCH}}{\sum_{r=0}^{C_{UL-SCH}-1} K_r} \right\rceil, \left(\sum_{l=0}^{N_{symb,all}^{PUSCH}-1} M_{sc}^{\Phi UCI}(l)\right) - Q'_{ACK} - \left\lceil \frac{\sum_{r=0}^{C_{UL-SCH}-1} K_r}{R1 \times Q_m} \right\rceil \right\}$$ [Equation 4-1]

$$Q'_{CSI,2} = \min\left\{\left\lceil \frac{(O_{CSI,2}+L) \cdot M_{sc}^{PUSCH} \cdot N_{symb}^{PUSCH} \cdot \beta_{offset}^{PUSCH}}{\sum_{r=0}^{C_{UL-SCH}-1} K_r} \right\rceil, \left(\sum_{l=0}^{N_{symb,all}^{PUSCH}-1} M_{sc}^{\Phi UCI}(l)\right) - Q'_{ACK} - Q'_{CSI,1} - \left\lceil \frac{\sum_{r=0}^{C_{UL-SCH}-1} K_r}{R1 \times Q_m} \right\rceil \right\}$$ [Equation 5-1]

[Method 1-d]

Part-2 CSI can be sequentially omitted such that a part-2 CSI coding rate becomes less than the ratio of a PUSCH target coding rate $C_{MCS}$ to the offset beta_offset.

Here, $C_{MCS}$ may be a target coding rate corresponding to each MCS index indicated on a UL grant, as shown in Table 5. In the case of a specific MCS index (e.g., $I_{MCS}$=28, 29, 30 or 31), a target coding rate corresponding thereto may not be present. In this case, the target coding rate may be preset for the corresponding $I_{MCS}$ (for example, a maximum or minimum target coding rate corresponding a modulation order corresponding thereto) or may be set to a target coding rate corresponding to an MCS index indicated by an initially transmitted UL grant of an associated HARQ process index (or most recent UL grant having a target coding rate corresponding to an indicated MCS index) if the corresponding MCS index can be indicated during PUSCH retransmission.

If a terminal successfully decodes an uplink DCI format for a serving cell c in a slot n, the terminal can perform aperiodic CSI reporting in a slot n+Y using a PUSCH. Here, Y can be indicated in the uplink DCI format.

A higher layer parameter "AperiodicReportSlotOffset" can represent values Y permitted in a given reporting configuration.

An aperiodic CSI report delivered through a PUSCH supports wideband, partial band and subband frequency granularity and also supports type-I CSI and type-II CSI.

If the terminal successfully decodes an uplink DCI format, the terminal may perform semi-persistent CSI reporting. The uplink DCI format may include one or more CSI reporting configuration indications, and an associated CSI measurement link and CSI resource configuration can be set by a higher layer.

Semi-persistent CSI reporting through a PUSCH supports type-I CSI and type-II CSI and also supports frequency granularity of wideband, partial band and subband. PUSCH resources and MCS can be semi-persistently allocated through uplink DCI.

CSI reporting through a PUSCH can be multiplexed with data through the PUSCH. CSI reporting through a PUSCH may be performed without being multiplexed with another uplink data.

CSI reporting through a PUSCH can support type-I CSI feedback and type-II CSI feedback. Type-I subband CSI can be supported for CSI reporting through a PUSCH.

In type-I CSI feedback through a PUSCH, a CSI report can include up to two parts. Part 1 of the two parts can include an RI/CRI and a CQI with respect to a first codeword and part 2 can include a PMI, and when RI>4, a CQI with respect to a second codeword.

In type-II CSI feedback through a PUSCH, a CSI report can include up to two parts. Part 1 can be used to identify the number of information bits in part 2. Part 1 may need to be transmitted before part 2 and the entire part 1 may be used to identify the number of information bits in part 2. Part 1 may have a fixed payload size and include an RI, a CQI and a coefficient per layer for part-II CSI (e.g., a non-zero wideband amplitude coefficient), and fields including such values may be individually encoded.

Part 2 may include a PMI of type-II CSI. Part 1 and part 2 may be individually encoded. A type-II CSI report delivered through a PUSCH can be calculated independently of an arbitrary type-II CSI report delivered through a long PUCCH.

When a higher layer parameter "ReportQuantity" is set to "CRI/RSRP" or "SSBRI/RSRP", CSI feedback can be composed of only one part.

When CSI reporting through a PUSCH includes two parts, a terminal may omit some of part-2 CSI. Omission of part-2 CSI may be performed on the basis of the priority shown in Table 4.

When CSI and data are multiplexed to a PUSCH, part-2 CSI can be omitted only when a UCI coding rate when all information of part 2 is intended to be transmitted is greater than a threshold coding rate $C_T$.

$C_T$ can be determined as $C_{MCS}/\beta^{CSI-2}_{offset}$. Here, $C_{MCS}$ is a PUSCH target coding rate and $\beta^{CSI-2}_{offset}$ is an offset value beta_offset.

Part-2 CSI can be omitted for each level (according to priority), and omission of part-2 CSI can be performed from part-2 CSI with a lowest level (lowest priority) and low-level part-part CSI is sequentially omitted until the UCI coding rate becomes lower than $C_T$.

Meanwhile, when a HARQ-ACK payload (or a part-1 CSI payload or a part-2 CSI payload, which may or may not include a CRC) has a larger size than a UL-SCH information bit to be transmitted, the HARQ-ACK payload (or the part-1 CSI payload or the part-2 CSI payload) is loaded on all scheduled REs all the time irrespective of the number of REs allocated to a PUSCH (because the offset value beta_offset is larger than 1). Particularly, this may frequently occur when only some code block groups (CBGs) among all transport blocks (TBs) are retransmitted. To prevent this, $C_{UL-SCH}$ can be interpreted as the number of code blocks (CBs) of an initially transmitted PUSCH of a corresponding HARQ process index instead of the number of CBs of a current UL-SCH, and $K_r$ can be interpreted as the number of bits of an r-th CB of an initially transmitted PUSCH.

In the above-described [Method 1-a], the maximum number P of PUSCH data symbols (or the maximum number of REs or the maximum number of coded symbols) through which part-2 CSI can be transmitted can be limited. The value P may be predetermined, set according to RRC signalling or MAC CE or signalled through a UL grant. If P is set through RRC signaling (or MAC CE or UL grant), a default value before P is set may need to be set. In this case, P may be set to a predefined value (e.g., P=2) or may be set to infinity (i.e., P=infinity). In addition, P may be set differently according to an RB size and/or the number of symbols of a scheduled PUSCH. For example, P may be set to a larger value as the RB size decreases or set to a smaller value as the number of symbols of the PUSCH decreases.

In piggybacking of UCI on a PUSCH including a UL-SCH (data), if a specific offset beta_offset for configured/ indicated part-2 CSI is equal to or less than a predetermined threshold value (e.g., 0.15 or 0), the part-2 CSI can be dropped.

<Piggybacking UCI on PUSCH (when PUSCH Includes No Data (UL-SCH)>

A method of omitting a part of part-2 CSI and an RE mapping rule when UCI piggybacks on a PUSCH including no UL-SCH (data) are proposed.

[Method 2-a]

The same method as the above-described [Method 1-a] can be applied except that a maximum number of REs (or a maximum number of coded symbols) through which part-2 CSI can be transmitted can be limited to {the number of allocated PUSCH data REs–the number of REs on which HARQ-ACK will piggyback–the number of REs on which part-1 CSI will piggyback} in restriction of a maximum number of PUSCH data symbols (or a maximum number of REs or a maximum number of coded symbols) through which part-2 CSI can be transmitted.

This is for the purpose of filling REs in which HARQ-ACK and part-1 CSI are not transmitted with part-2 CSI as long as possible. Here, when there is no HARQ-ACK information to be transmitted in a corresponding slot, the HARQ-ACK information may not be considered.

For example, when a PUSCH is scheduled over 10 resource blocks in the example of FIG. 12, {the number of allocated PUSCH data REs–the number of REs on which HARQ-ACK will piggyback–the number of REs on which part-1 CSI will piggyback}=200.

Here, if block #1+block #2+block #3 are intended to be transmitted, the number of coded symbols necessary for transmission, which is calculated on the basis of the offset beta_offset and the size of a part-2 CSI payload to be transmitted (80 bits in the example of FIG. 12), may be 400.

Further, if block #1+block #2 are intended to be transmitted, the number of coded symbols necessary for transmission, which is calculated on the basis of the offset beta_offset and the size of a part-2 CSI payload to be transmitted (50 bits in the example of FIG. 12), may be 250.

Further, if block #1 is intended to be transmitted, the number of coded symbols necessary for transmission, which is calculated on the basis of the offset beta_offset and the size of a part-2 CSI payload to be transmitted (20 bits in the example of FIG. 12), may be 100.

Accordingly, in order to transmit as many blocks as possible while limiting the number of necessary coded block to less than 200, block #2 and block #3 can be omitted and only block #1 can be transmitted. Here, block #1 may be transmitted using 100 coded symbols calculated on the basis of the offset beta_offset or rate-matched to 200 coded symbols and then transmitted.

Alternatively, when a PUSCH is scheduled over 10 resource blocks in the example of FIG. 12, {the number of allocated PUSCH data REs–the number of REs on which HARQ-ACK will piggyback–the number of REs on which part-1 CSI will piggyback}=200.

Here, a maximum payload size K calculated on the basis of the offset beta_offset and the limited number of available REs (i.e., 200) may be 40 bits. Since 40 bits is smaller than 80 bits corresponding to all part-2 CSI, omission needs to be performed from a low-priority block. To transmit as many high-priority blocks having a payload size less than 40 bits as possible, it is possible to omit block #2 and block #3 and to transmit only block #1. Here, block #1 may be transmitted through 100 coded symbols calculated on the basis of the offset beta_offset or may be rate-match to all of 200 coded symbols and then transmitted.

[Method 2-b]

80 bits corresponding to all part-2 CSI may be rate-matched to all of 200 coded symbols and then transmitted in the example of FIG. 12.

[Method 2-c]

A (maximum) part-2 CSI payload size can be directly indicated using a UL grant. A maximum payload size of part-2 CSI may be determined according to rank information included in part-1 CSI. For example, when the maximum payload size of the part-2 CSI is S1 when the rank value is 1 and S2 (S2 may be greater than S1) when the rank value is 2, it is possible to indicate whether the maximum payload size of part-2 CSI is limited to S1 or S2 using the UL grant. If the maximum payload size is indicated as S1 but part-1 CSI is configured using information of the rank value of 2, the payload size of the part-2 CSI can be set to S1 or as many high-priority blocks having a payload size less than S1 as possible can be transmitted and transmission of the remaining low-priority blocks can be omitted.

For example, when S1 is 60 bits, block #3 can be omitted and only block #1+block #2 can be transmitted in the example of FIG. 12. Here, the ratio of the number of coded symbols carrying part-1 CSI to the number of coded symbols carrying part-2 CSI can be determined according to the indicated part-2 CSI payload size. For example, when the payload size of part-1 CSI is S3 bits, the ratio of the number of coded symbols carrying part-1 CSI to the number of coded symbols carrying part-2 CSI is set to S3:S1 (or S3 (for part-1 CSI)*offset (beta_offset):S1 (for part-2 CSI)*offset (beta_offset) or the ratio of the offset (beta_offset) for part-1 CSI to the offset (beta_offset) for part-2 CSI) when S1 is indicated through a UL grant, and the ratio of the number of coded symbols carrying part-1 CSI to the number of coded symbols carrying part-2 CSI is set to S3:S2 (or S3 (for part-1 CSI)*offset (beta_offset):S2 (for part-2 CSI)*offset (beta_offset) or the ratio of the offset (beta_offset) (for part-1 CSI) to the offset (beta_offset) (for part-2 CSI)) when S2 is indicated through a UL grant, and thus part-1 CSI and part-2 CSI can be mapped to PUSCH REs left after HARQ-ACK information piggybacking.

Here, the method of directly indicating the (maximum) part-2 CSI payload size using a UL grant may correspond to a specific state of the offset beta_offset for part-2 CSI which is dynamically indicated. For example, when the offset value beta_offset (for the part-2 CSI) is equal to or less than (or greater than) a set threshold, the UL grant can indicate that the maximum payload size of the part-2 CSI is limited to S1.

[Method 2-d]

HARQ-ACK and/or part-1 CSI (and/or L1-RSRP) can piggyback in addition to part-2 CSI in piggybacking of UCI on a PUSCH as in [Method 1-a/b/c] and [Method 2-a/b/c]. Here, a maximum number P' of PUSCH data symbols (or a maximum number of REs or a maximum number of coded symbols) through which HARQ-ACK and/or part-1 CSI (and/or L1-RSRP) can be transmitted may be limited as in [Method 1-a]. If the number of coded symbols which is calculated on the basis of the HARQ-ACK payload size (or a part-1 CSI payload size) and the offset beta_offset with respect to HARQ-ACK (or part-1 CSI) is greater than the limited maximum number P' of PUSCH data symbols (or the maximum number of REs or the maximum number of coded symbols), the HARQ-ACK (or part-1 CSI or L1-RSRP) can be transmitted only using the limited maximum number of PUSCH data symbols (or the maximum number of REs or the maximum number of coded symbols).

Here, the value P' may be predetermined, set according to RRC signalling or MAC CE or signaled through a UL grant. If P' is set through RRC signaling (or MAC CE or UL grant), a default value before P' is set may need to be set. In this case, P' may be set to a predefined value (e.g., P'=2) or may be set to infinity (i.e., P'=infinity).

In addition, P' may be set differently according to an RB size and/or the number of symbols of a scheduled PUSCH. For example, P' may be set to a larger value as the RB size decreases or set to a smaller value as the number of symbols of the PUSCH decreases.

Alternatively, in piggybacking of the HARQ-ACK and/or the part-1 CSI, a number of coded symbols, calculated on the basis of the offset beta_offset for the HARQ-ACK (or part-1 CSI), may be mapped in the order of the HARQ-ACK and the part-1 CSI without the limitation.

[Method 2-d] can be equally applied in a case in which, when a UCI payload size is equal to or greater than a specific number of bits and thus segmentation and separate encoding are performed, segment part 1 and/or segment part 2 are transmitted over a PUSCH having a UL-SCH (data).

Figure 14:
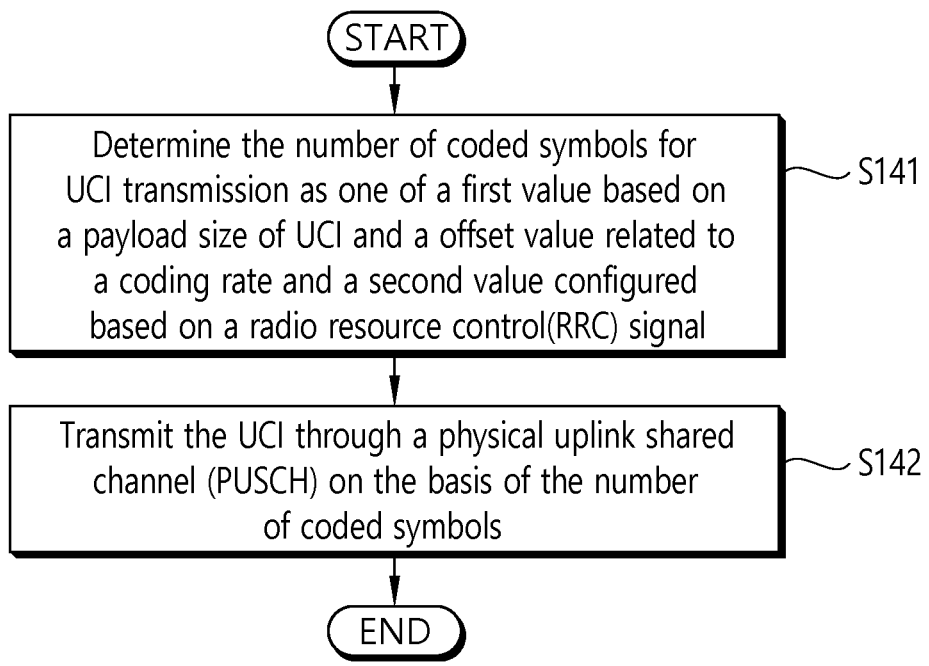
FIG. 14 illustrates a UCI transmission method of a terminal according to another embodiment of the present invention.

FIG. 14 illustrates a UCI transmission method of a terminal according to another embodiment of the present invention.

Referring to FIG. 14, the terminal determines the number of coded symbols for UCI transmission between a first value based on a payload size of UCI and an offset value related to a coding rate and a second value set on the basis of a radio resource control (RRC) signal (S141). For example, the number of coded symbols may be determined as a smaller value between the first value and the second value.

The terminal transmits the UCI through a physical uplink shared channel (PUSCH) on the basis of the number of coded symbols (S142).

The UCI can be transmitted along with data through the PUSCH. The UCI may be ACK/NACK (acknowledgement/negative-acknowledgement) or channel state information (CSI), more specifically, part-1 CSI or part-2 CSI. The RRC signal may include information for limiting the number of resource elements allocated to the UCI in the PUSCH.

Referring to FIG. 14, when HARQ-ACK is transmitted along with a UL-SCH (data) through the PUSCH, for example, the number of coded modulation symbols (per layer) for HARQ-ACK transmission can be determined as represented by the following Equation.

$$Q'_{ACK} = \min\left\{ \left\lceil \frac{(O_{ACK} + L_{ACK}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=l_0}^{N^{PUSCH}_{symb,all}-1} M^{UCI}_{sc}(l) \right\rceil \right\}$$ [Equation 6]

In the above Equation, $O_{ACK}$ is the number of HARQ-ACK bits. LACK is 11 if $O_{ACK}$ is equal to or more than 360 ($O_{ACK} \geq 360$) otherwise LACK is the number of CRC bits. $M^{PUSCH}_{sc}$ is the scheduled bandwidth of the PUSCH transmission, expressed as a number of subcarriers, $N^{PUSCH}_{symb}$ is the number of OFDM symbols for PUSCH transmission (except OFDM symbols used for a DMRS), $\beta^{PUSCH}_{offset}$ is $\beta^{HARQ-ACK}_{offset}$, $C_{UL-SCH}$ is the number of code blocks for a UL-SCH in PUSCH transmission, $K_r$ is the size of an r-th code block for the UL-SCH in PUSCH transmission, and $M^{UCI}_{sc}(l)$ is the number of resource elements available for UCI transmission in OFDM symbol l.

α is a value set by a higher layer signal (parameter) such as an RRC signal.

Equation 6 is configured in the form of min (A, B). The first value based on the UCI payload size and offset value related to the coding rate(=coding rate related offset value) corresponds to A in Equation 6 and the second value set on the basis of the RRC (radio resource control) signal corresponds to B in Equation 6.

That is, when UCI is transmitted through a PUSCH, the number of coded symbols (more specifically, coded modulation symbols) of the UCI needs to be determined. Here, in the conventional technology, the amount of resources being necessary for UCI transmission based on the payload size of the UCI is simply compared with the amount of resources allocated for UCI transmission on the PUSCH and then the number of coded symbols is determined on the basis of the smaller amount of resources.

However, the present invention determines the number of coded modulation symbols of the UCI as a smaller value between the first value based on the UCI payload size and a coding rate related offset value and the second value set on the basis of an RRC signal. Accordingly, it is possible to control a network to determine the number of coded modulation symbols of the UCI more accurately in NR which needs to provide various services that require various requirements.

[Method 2-d] and detailed description thereof illustrated in FIG. 14 can also be applied to part-1 CSI and part-2 CSI.

The case of part-1 CSI may conform to the following Equation 7 and part-2 CSI may conform to the following Equation 8.

$$Q'_{CSI-1} = \min\left\{ \left\lceil \frac{(O_{CSI-1} + L_{CSI-1}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) \right\rceil - Q'_{ACK} \right\}$$

[Equation 7]

$O_{CSI-1}$ is the number of part-1 CSI (CSI part 1) bits. $L_{CSI-1}$ is 11 if $O_{CSI-1}$ is 360 or more, otherwise $L_{CSI-1}$ is the number of CRC bits if not. $M^{PUSCH}_{sc}$ is the number of scheduled bandwidth for PUSCH transmission (the number of subcarriers), $N^{PUSCH}_{symb}$ is the number of OFDM symbols for PUSCH transmission, $\beta^{PUSCH}_{offset}$ is $\beta^{CSI-part1}_{offset}$, $C_{UL-SCH}$ is the number of code blocks for a UL-SCH in PUSCH transmission, $K_r$ is the size of an r-th code block for the UL-SCH in PUSCH transmission, and $M^{UCI}_{sc}(l)$ is the number of resource elements available for UCI transmission in OFDM symbol l.

α is a value set by a higher layer signal (parameter) such as an RRC signal.

$$Q'_{CSI-2} = \min\left\{ \left\lceil \frac{(O_{CSI-2} + L_{CSI-2}) \cdot \beta^{PUSCH}_{offset} \cdot \sum_{l=0}^{N^{PUSCH}_{symb,all}-1} M^{UCI}_{sc}(l)}{\sum_{r=0}^{C_{UL-SCH}-1} K_r} \right\rceil, \left\lceil \alpha \cdot \sum_{l=0}^{N^{PUSCH}_{symb,all}-1} M^{UCI}_{sc}(l) \right\rceil - Q'_{ACK} - Q'_{CSI-1} \right\}$$

[Equation 8]

$O_{CSI-2}$ is the number of part-2 CSI (CSI part 2) bits. $L_{CSI-2}$ is 11 if $O_{CSI-2}$ is 360 or more, otherwise $L_{CSI-2}$ is the number of CRC bits. $M^{PUSCH}_{sc}$ is the number of scheduled bandwidth for PUSCH transmission (the number of subcarriers), $N^{PUSCH}_{symb}$ is the number of OFDM symbols for PUSCH transmission (except OFDM symbols used for a DMRS), $\beta^{PUSCH}_{offset}$ is $\beta^{CSI-part2}_{offset}$, $C_{UL-SCH}$ is the number of code blocks for a UL-SCH in PUSCH transmission, $K_r$ is the size of an r-th code block for the UL-SCH in PUSCH transmission, and $M^{UCI}_{sc}(l)$ is the number of resource elements available for UCI transmission in OFDM symbol l.

α is a value set by a higher layer signal (parameter) such as an RRC signal.

As described above, if all part-2 CSI cannot be transmitted through a PUSCH, low-priority part-2 CSI can be omitted according to priority. That is, it is possible to omit part-2 CSI per level according to priority instead of omitting only some bits of part-2 CSI.

[Method 2-e]

When UCI piggybacks on a PUSCH including a UL-SCH (data), the number of coded symbols through which the UCI is transmitted can be determined in consideration of a UL-SCH coding rate. However, when UCI piggybacks on a PUSCH including no UL-SCH (data), a UL-SCH coding rate is not present and thus a reference coding rate needs to be set.

$$Q' = \min\left( \left\lceil \frac{O \cdot M^{PUSCH}_{sc} \cdot N^{PUSCH}_{symb} \cdot \beta^{PUSCH}_{offset}}{O_{CQI-MIN}} \right\rceil, \alpha \cdot M^{PUSCH}_{sc} \right)$$

[Equation 9]

The above Equation represents a method of setting the number of coded symbols of HARQ-ACK when UCI piggybacks on a PUSCH including no UL-SCH (data) in LTE. A reference data payload when the numbers of coded symbols of HARQ-ACK, part-1 CSI and/or part-2 CSI are set has a CQI payload size (including a CRC) when ranks corresponding to all cells in which CSI reports are configured are 1.

In the NR system, the reference data payload when the numbers of coded symbols of HARQ-ACK, part-1 CSI and/or part-2 CSI are set can be determined as one of the following values and may be set differently for UCI types.

1) Opt. 1: A maximum value (or a minimum value) of part-2 CSI (which may or may not include a CRC) when ranks corresponding to all CSI types (or all CSI report configurations, for example, N in FIG. 11) in which CSI reports are configured (or corresponding to predetermined CSI types among N CSI types) are assumed to be 1.

2) Opt. 2: A maximum value (or a minimum value) of part-2 CSI (which may or may not include a CRC) when ranks corresponding to all CSI types (or all CSI report configurations, for example, N in FIG. 11) in which CSI reports are configured (or corresponding to predetermined CSI types among N CSI types) are assumed to be 2.

3) Opt. 3: A maximum value (or a minimum value) of part-1 CSI (which may or may not include a CRC) corresponding to all CSI types (N in FIG. 11) in which CSI reports are configured (or corresponding to predetermined CSI types among N CSI types) are assumed to be 2.

Here, the value α in the aforementioned Equations may be signalled as described in [Method 2-d], may be predetermined or may not be restricted.

With respect to [Method 2-e], the number of REs of part-1 CSI can be determined as represented by the following Equation.

$$Q'_{CSI,1} = \min\left\{\left\lceil \frac{(O_{CSI,1} + L) \cdot M_{sc}^{PUSCH} \cdot N_{symb}^{PUSCH} \cdot \beta_{offset}^{PUSCH}}{O_{CSI}} \right\rceil, \right.$$

$$\left. \sum_{l=0}^{N_{symb,all}^{PUSCH}-1} M_{sc}^{\Phi^{UCI}}(l) - Q'_{ACK} \right\}$$

[Equation 10]

An offset value beta_offset can be determined such that $\beta^{PUSCH}_{offset} = \beta^{CSI-part1}_{offset}/\beta^{CSI-part2}_{offset}$. $O_{CSI}$ can be determined according to Opt. 1, Opt. 2 or Opt. 3 of [Method 2-e]. Alternatively, it may be a maximum value (or a minimum value) of part-2 CSI (which may or may not include a CRC) corresponding to part-1 CSI to be transmitted over the corresponding PUSCH, or the number of bits of predefined/preset specific part-2 CSI (including a CRC).

More generally, a part-2 CSI payload size applied/put to/input the expression Q' by which the number of REs allocated to "specific UCI type" which piggybacks on a PUSCH is determined can be determined as a specific reference (fixed) payload size. Here, the reference (fixed) part-2 CSI payload size can be determined as a payload size which assumes a maximum, minimum or specific rank value (e.g., 1) available for part-2 CSI. The PUSCH may also include a PUSCH carrying only UCI without data, and the "specific UCI type" may include at least part-1 CSI.

$$Q'_{ACK} = $$

[Equation 11]

$$\min\left\{\left\lceil \frac{(O_{ACK} + L_{ACK}) \cdot M_{sc}^{PUSCH} \cdot N_{symb}^{PUSCH} \cdot \beta_{offset}^{HACK-ACK}}{(O_{ACK} + L_{ACK}) \cdot \beta_{offset}^{HACK-ACK} +} \right.\right.$$
$$(O_{CSI,1} + L_{CSI,1}) \cdot \beta_{offset}^{CSI,1} +$$
$$\left.\left.(O_{CSI,2} + L_{CSI,2}) \cdot \beta_{offset}^{CSI,2} + \sum_{r=0}^{C_{UL-SCH}-1} K_r \right\rceil, \right.$$

$$\left. \sum_{l=0}^{N_{symb,all}^{PUSCH}-1} M_{sc}^{\Phi^{UCI}}(l) \right\}$$

In UCI piggybacking in the case of a PUSCH including data, the part-2 CSI payload size can be considered in determination of the number of REs allocated to HARQ-ACK. Here, $O_{CSI,2}$ can be determined as a specific reference (fixed) payload size. $L_{CSI,2}$ is the number of CRC bits corresponding to the specific reference (fixed) payload size.

[Method 2-f]

Part-2 CSI can be sequentially omitted such that a part-2 CSI coding rate becomes less than the ratio of a PUSCH target coding rate to the offset beta_offset in the case of a PUSCH without data (PUSCH w/o UL-SCH) as in [Method 1-d].

Here, $C_{MCS}$ may be a target coding rate corresponding to each MCS index indicated on a UL grant, as shown in Table 4. In the case of a specific MCS index (e.g., $I_{MCS}$=28, 29, 30 or 31), a target coding rate corresponding thereto may not be present. In this case, the target coding rate R1 may be preset for the corresponding $I_{MCS}$ (for example, a maximum or minimum target coding rate corresponding to a modulation order corresponding thereto) or may be set to a target coding rate corresponding to an MCS index indicated through a most recent UL grant including a target coding rate corresponding to an MCS index indicated by an associated HARQ process index.

Alternatively, $C_T$ can be set to be identical to a maximum coding rate set for PUCCH format 3 (or PUCCH format 4) or set to the ratio of the maximum coding rate set for PUCCH format 3 (or PUCCH format 4) to the offset beta_offset (e.g., $\beta^{CSI-2}_{offset}$). Here, PUCCH format 3 is a long PUCCH composed of four or more symbols and may be a PUCCH format supporting transmission of 2-bit UCI or more for which inter-terminal multiplexing is not supported. PUCCH format 4 is a long PUCCH composed of four or more symbols and may be a PUCCH supporting transmission of 2-bit UCI or more for which inter-terminal multiplexing (i.e., pre-DFT OCC) is supported.

<UCI Transmitted Through PUCCH>

When type-1 CSI (or type-2 CSI) is transmitted through a long PUCCH (or short PUCCH) (e.g., subband type-1 CSI), part-1 CSI and part-2 CSI can also be separately encoded. In this case, HARQ-ACK and part-1 CSI can be sequentially mapped first and part-2 CSI can be mapped to {the number of allocated PUSCH REs−the number of REs on which HARQ-ACK will piggyback−the number of REs on which part-1 CSI will piggyback} as in [Method 2-a]. That is, [Method 2-a] can be equally applied with respect to the fact that the number of coded symbols or REs to be transmitted is limited and part-2 CSI blocks to be actually transmitted is determined and the mapping method.

Alternatively, the methods proposed in <PUSCH without data (UL-SCH) case> may be equally applied. In this case, allocated resources can refer to resources allocated for a PUCCH. In addition, an offset value beta-offset when UCI piggybacks on a PUSCH may also be applied to the PUCCH, and offset values beta_offset for UCI transmission through the PUCCH may be separately set.

In the case of a long PUCCH, two formats in which UCI can be transmitted may be present for the UCI payload size corresponding to bits larger than 2 bits. One is a format (e.g., NR PUCCH format 3) which does not support CDM (code division multiplexing) between terminals and the other is a format (e.g., NR PUCCH format 4) supporting CDM between terminals (using pre-DFT OCC).

If part-1 CSI and part-2 CSI are separately encoded (or if a UCI payload size is equal to or greater than a specific number of bits and thus UCI is segmented and then separately encoded), a terminal can expect that the corresponding UCI is transmitted in NR PUCHC format 3. In a case in which part-1 CSI and part-2 CSI are separately encoded (or a UCI payload size is equal to or greater than a specific number of bits and thus UCI is segmented and then separately encoded), when the UCI has been configured to be transmitted only in NR PUCCH format 3 (for example, a PUCCH format has been explicitly signalled in DL allocation or a PUCCH format has been indicated through a PUCCH resource indicator) but a PUCCH resource corresponding to NR PUCCH format 4 is actually indicated, the terminal can be configured to drop part-2 CSI (or one of segmented UCI blocks) all the time.

In the above-described UCI piggybacking method, SR transmission may be set in a PUCCH or PUSCH slot in which HARQ-ACK, part-1 CSI and part-2 CSI are separately encoded and transmitted. In this case, the corresponding 1-bit SR (or more than 1 bit) may be appended to the last payload of HARQ-ACK or appended to the last payload of part-1 CSI.

The above-described UCI piggybacking method may be equally applied to semi-persistent PUSCH/PUCCH transmission. Here, a semi-persistent PUSCH/PUCCH may refer to a PUSCH/PUCCH which conforms to a scheme in which PUSCH/PUCCH transmission is performed according to transmission resources (and transmission periodicity) when a base station configures the transmission resources (and transmission periodicity) with respect to a PUSCH in advance through a higher layer signal and activates the transmission resources through a PDCCH (or RRC signalling) and the PUSCH/PUCCH transmission is stopped when the transmission resources are released through a PDCCH (or RRC signalling). Specifically, the methods proposed in <UCI piggybacking on PUSCH with data> and <UCI piggybacking on PUSCH without data (UL-SCH)> according to whether a UL-SCH (data) is transmitted can be applied to the semi-persistent PUSCH, and the method proposed in <UCI transmitted through PUCCH> can be applied to the semi-persistent PUCCH.

There was a configuration for simultaneous transmission of periodic CSI and HARQ-ACK in the conventional LTE system. When the configuration is enabled, periodic CSI and HARQ-ACK can be simultaneously transmitted over a PUSCH or a PUCCH. The periodic/semi-persistent/aperiodic CSI reporting method according to CSI reporting periodicity has been introduced to the NR system, and CSI and HARQ-ACK can be transmitted over a PUSCH or a PUCCH. A configuration for simultaneous transmission of CSI and HARQ-ACK according to reporting periodicity can be separately set. That is, configuration #1 for simultaneous transmission of periodic CSI and HARQ-ACK, configuration #2 for simultaneous transmission of semi-persistent CSI and HARQ-ACK and configuration #3 for simultaneous transmission of aperiodic CSI and HARQ-ACK can be separately set.

Examples of the above-described proposed methods can also be included as implementation methods of the present invention and thus can be regarded as proposed methods. In addition, while the above-described proposed methods can be independently realized, some thereof can be combined (merged). A rule can be defined such that a base station informs terminals of information indicating whether the above-described proposed methods are applied (or information about rules of the above-described proposed methods) through a predefined signal (e.g., a physical layer signal or a higher layer signal).

Figure 15:
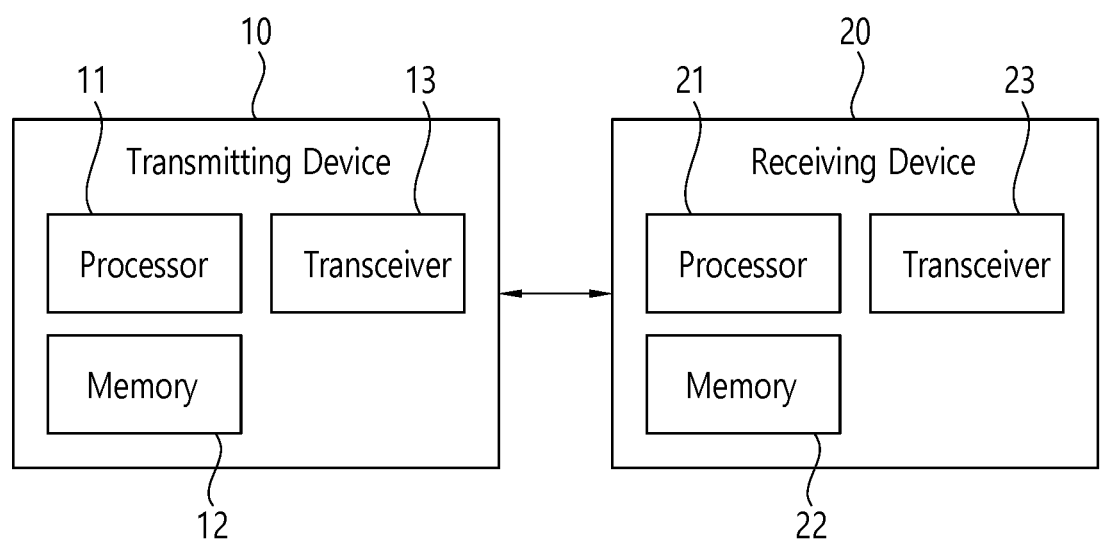
FIG. 15 is a block diagram showing components of a transmitting device 10 and a receiving device 20 for implementing the present invention.

FIG. 15 is a block diagram showing components of a transmitting device 10 and a receiving device 20 for implementing the present invention. Here, the transmitting device and the receiving device may be a base station and a terminal.

The transmitting device 10 and the receiving device 20 may respectively include transceivers 13 and 23 capable of transmitting or receiving radio frequency (RF) signals carrying information, data, signals and messages, memories 12 and 22 for storing various types of information regarding communication in a wireless communication system, and processors 11 and 21 connected to components such as the transceivers 13 and 23 and the memories 12 and 22 and configured to control the memories 12 and 22 and/or the transceivers 13 and 23 such that the corresponding devices perform at least one of embodiments of the present invention.

The memories 12 and 22 can store programs for processing and control of the processors 11 and 21 and temporarily store input/output information. The memories 12 and 22 may be used as buffers.

The processors 11 and 21 generally control overall operations of various modules in the transmitting device and the receiving device. Particularly, the processors 11 and 21 can execute various control functions for implementing the present invention. The processors 11 and 21 may be referred to as controllers, microcontrollers, microprocessors, microcomputers, etc. The processors 11 and 21 can be realized by hardware, firmware, software or a combination thereof. When the present invention is realized using hardware, the processors 11 and 21 may include ASICs (application specific integrated circuits), DSPs (digital signal processors), DSPDs (digital signal processing devices), PLDs (programmable logic devices), FPGAs (field programmable gate arrays) or the like configured to implement the present invention. When the present invention is realized using firmware or software, the firmware or software may be configured to include modules, procedures or functions for performing functions or operations of the present invention, and the firmware or software configured to implement the present invention may be included in the processors 11 and 21 or stored in the memories 12 and 22 and executed by the processors 11 and 21.

The processor 11 of the transmitting device 10 can perform predetermined coding and modulation on a signal and/or data to be transmitted to the outside and then transmit the signal and/or data to the transceiver 13. For example, the processor 11 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 13 may include an oscillator for frequency up-conversion. The transceiver 13 may include one or multiple transmission antennas.

The signal processing procedure of the receiving device 20 may be reverse to the signal processing procedure of the transmitting device 10. The transceiver 23 of the receiving device 20 can receive RF signals transmitted from the transmitting device 10 under the control of the processor 21. The transceiver 23 may include one or multiple reception antennas. The transceiver 23 can frequency-down-convert signals received through the reception antennas to restore baseband signals. The transceiver 23 may include an oscillator for frequency down conversion. The processor 21 can perform decoding and demodulation on RF signals received through the reception antennas to restore data that is intended to be transmitted by the transmitting device 10.

The transceivers 13 and 23 may include one or multiple antennas. The antennas can transmit signals processed by the transceivers 13 and 23 to the outside or receive RF signals from the outside and deliver the RF signal to the transceivers 13 and 23 under the control of the processors 11 and 21 according to an embodiment of the present invention. The antennas may be referred to as antenna ports. Each antenna may correspond to one physical antenna or may be configured by a combination of a plurality of physical antenna elements. A signal transmitted from each antenna cannot be decomposed by the receiving device 20. A reference signal (RS) transmitted corresponding to an antenna defines an antenna from the viewpoint of the receiving device 20 and can allow the receiving device 20 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 16:
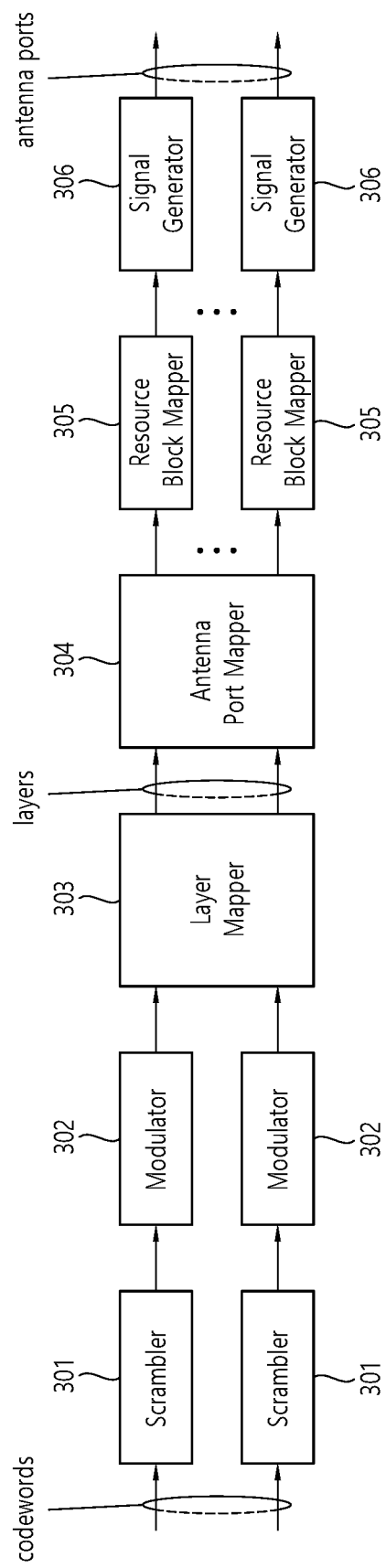
FIG. 16 illustrates an example of a signal processing module structure in the transmitting device 10.

FIG. 16 illustrates an example of a signal processing module structure in the transmitting device 10. Here, signal processing can be performed by a processor of a base station/terminal, such as the processor 11 of FIG. 15.

Referring to FIG. 16, the transmitting device 10 included in a terminal or a base station may include scramblers 301, modulators 302, a layer mapper 303, an antenna port mapper 304, resource block mappers 305 and signal generators 306.

The transmitting device 10 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 17:
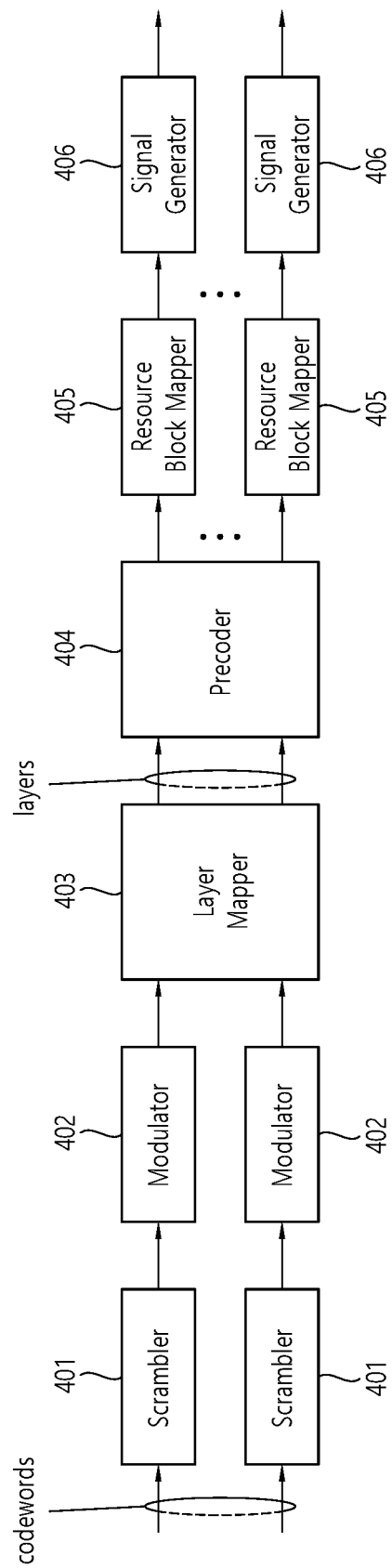
FIG. 17 illustrates another example of the signal processing module structure in the transmitting device 10.

FIG. 17 illustrates another example of the signal processing module structure in the transmitting device 10. Here, signal processing can be performed by a processor of a terminal/base station, such as the processor 11 of FIG. 15.

Referring to FIG. 17, the transmitting device 10 included in a terminal or a base station may include scramblers 401, modulators 402, a layer mapper 403, a precoder 404, resource block mappers 405 and signal generators 406.

The transmitting device 10 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N×M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter. The signal processing procedure of the receiving device 20 may be reverse to the signal processing procedure of the transmitting device. Specifically, the processor 21 of the transmitting device 10 decodes and demodulates RF signals received through antenna ports of the transceiver 23. The receiving device 20 may include a plurality of reception antennas, and signals received through the reception antennas are restored to baseband signals, and then multiplexed and demodulated according to MIMO to be restored to a data string intended to be transmitted by the transmitting device 10.

The receiving device 20 may include a signal restoration unit for restoring received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit for removing a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 18:
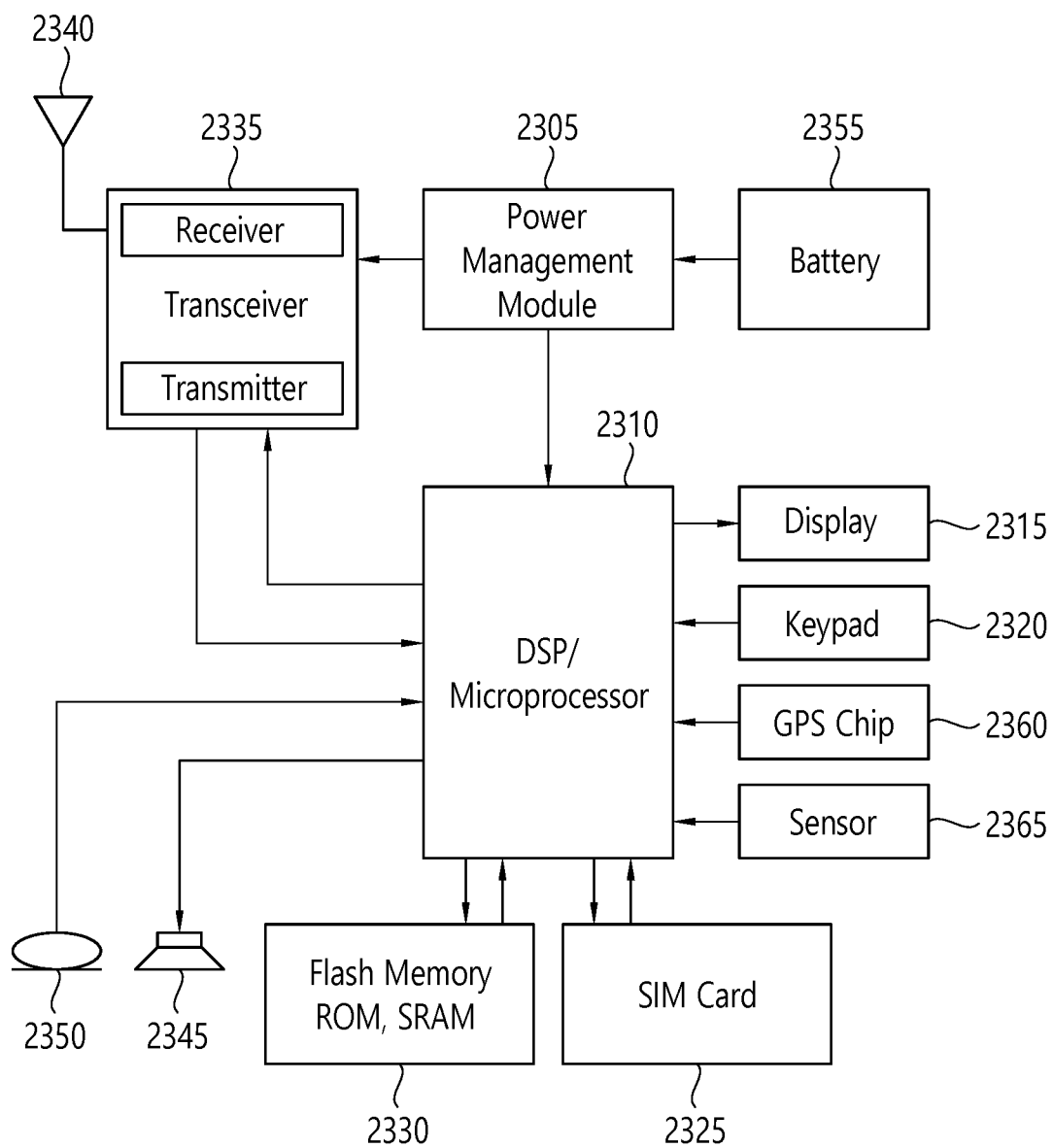
FIG. 18 illustrates an example of a wireless communication device according to an implementation example of the present invention.

FIG. 18 illustrates an example of a wireless communication device according to an implementation example of the present invention.

Referring to FIG. 18, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 18 may be the processors 11 and 21 in FIG. 15.

The memory 2330 is connected to the processor 231 and stores information related to operations of the processor. The memory may be located inside or outside the processor and connected to the processor through various techniques such as wired connection and wireless connection. The memory 2330 in FIG. 18 may be the memories 12 and 22 in FIG. 15.

A user can input various types of information such as telephone numbers using various techniques such as pressing buttons of the keypad 2320 or activating sound using the microphone 250. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 18 may be the transceivers 13 and 23 in FIG. 15.

Although not shown n FIG. 18, various components such as a camera and a universal serial bus (USB) port may be additionally included in the terminal. For example, the camera may be connected to the processor 2310.

FIG. 18 is an example of implementation with respect to the terminal and implementation examples of the present invention are not limited thereto. The terminal need not essentially include all the components shown in FIG. 18. That is, some of the components, for example, the keypad 2320, the GPS chip 2360, the sensor 2365 and the SIM card 2325 may not be essential components. In this case, they may not be included in the terminal.

What is claimed is:

1. A method for transmitting uplink control information (UCI) of a terminal in a wireless communication system, the method comprising:
   receiving, by the terminal, information regarding a scaling factor;
   determining a number of coded symbols for transmitting the UCI, based on a minimum between (i) a first value that depends on a payload size of the UCI and a beta offset value, and (ii) a second value that depends on the scaling factor multiplied by a total amount of resource elements allocated for a physical uplink shared channel (PUSCH) transmitting the UCI; and
   transmitting the UCI on the PUSCH based on the number of coded symbols.

2. The method of claim 1, wherein the UCI is transmitted with data through the PUSCH.

3. The method of claim 1, wherein the UCI is Hybrid Automatic Repeat Request Acknowledgement (HARQ-ACK) information.

4. The method of claim 1, wherein the UCI comprises channel state information (CSI).

5. The method of claim 1, wherein receiving the information regarding the scaling factor comprises:

receiving information regarding the total amount of resource elements allocated for the PUSCH transmitting the UCI.

6. The method of claim 1, wherein the beta offset value is related to a code rate.

7. The method of claim 1, wherein based on an available resource amount of a physical uplink shared channel (PUCCH) not being sufficient to transmit the UCI, a part of the UCI is omitted in units of blocks according to a level related to a priority of blocks.

8. The method of claim 1, wherein the information regarding the scaling factor is received through higher-layer signaling.

9. The method of claim 8, wherein the information regarding the scaling factor is received through radio resource control (RRC) signaling.

10. The method of claim 1, wherein the number of coded symbols for transmitting the UCI is constrained to be less than the total amount of resource elements allocated for the PUSCH transmitting the UCI.

11. The method of claim 1, wherein the number of coded symbols for transmitting the UCI is constrained to be less than the scaling factor multiplied by the total amount of resource elements allocated for the PUSCH transmitting the UCI.

12. A terminal configured to transmit uplink control information (UCI) in a wireless communication system, the terminal comprising:
   a transceiver;
   at least one processor; and
   at least one computer memory operably connectable to the at least one processor and storing instructions that, when executed by the at least one processor, perform operations comprising:
       receiving, through the transceiver, information regarding a scaling factor;
       determining a number of coded symbols for transmitting the UCI, based on a minimum between (i) a first value that depends on a payload size of the UCI and a beta offset value, and (ii) a second value that depends on the scaling factor multiplied by a total amount of resource elements allocated for a physical uplink shared channel (PUSCH) transmitting the UCI; and
       transmitting, through the transceiver, the UCI on the PUSCH based on the number of coded symbols.

13. The terminal of claim 12, wherein the UCI is transmitted with data through the PUSCH.

14. The terminal of claim 12, wherein the UCI is Hybrid Automatic Repeat Request Acknowledgement (HARQ-ACK) information.

15. The terminal of claim 12, wherein the UCI comprises channel state information (CSI).

16. The terminal of claim 12, wherein receiving the information regarding the scaling factor comprises:
   receiving information regarding the total amount of resource elements allocated for the PUSCH transmitting the UCI.

17. The terminal of claim 12, wherein the beta offset value is related to a code rate.

18. The terminal of claim 12, wherein based on an available resource amount of a physical uplink shared channel (PUCCH) not being sufficient to transmit the UCI, a part of the UCI is omitted in units of blocks according to a level related to a priority of blocks.

* * * * *